United States Patent
Ryu et al.

(10) Patent No.: US 11,804,923 B2
(45) Date of Patent: Oct. 31, 2023

(54) METHOD AND DEVICE FOR CONTROLLING MULTIPLE LINKS IN WIRELESS LAN SYSTEM SUPPORTING MULTIPLE LINKS

(71) Applicant: LG ELECTRONICS INC., Seoul (KR)

(72) Inventors: Kiseon Ryu, Seoul (KR); Jeongki Kim, Seoul (KR); Sanggook Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 259 days.

(21) Appl. No.: 17/286,048

(22) PCT Filed: Oct. 24, 2019

(86) PCT No.: PCT/KR2019/014096
§ 371 (c)(1),
(2) Date: Apr. 16, 2021

(87) PCT Pub. No.: WO2020/085824
PCT Pub. Date: Apr. 30, 2020

(65) Prior Publication Data
US 2021/0385006 A1 Dec. 9, 2021

Related U.S. Application Data

(60) Provisional application No. 62/750,196, filed on Oct. 24, 2018.

(51) Int. Cl.
*H04W 84/12* (2009.01)
*H04L 1/00* (2006.01)
*H04L 1/1607* (2023.01)

(52) U.S. Cl.
CPC .......... *H04L 1/0025* (2013.01); *H04L 1/1614* (2013.01); *H04W 84/12* (2013.01)

(58) Field of Classification Search
CPC ..... H04L 1/0025; H04L 1/1614; H04W 84/12
(Continued)

(56) References Cited

U.S. PATENT DOCUMENTS

2019/0349067 A1* 11/2019 Huang ................ H04W 72/046
2020/0015219 A1* 1/2020 Asterjadhi ............ H04W 72/23
2020/0107393 A1* 4/2020 Chu ....................... H04L 1/0003

FOREIGN PATENT DOCUMENTS

KR  1020130109420   10/2013
KR  1020130137572   12/2013
(Continued)

*Primary Examiner* — Christopher R Crompton
(74) *Attorney, Agent, or Firm* — BRYAN CAVE LEIGHTON PAISNER LLP

(57) ABSTRACT

A method performed in a wireless local area network (LAN) system according to various embodiments is associated with a first station (STA) supporting multi-links comprising first and second links. A control field associated with an operating mode (OM) of the first STA can be associated with the on-off of the first link and/or the second link. The first and second links can each be a channel for various bandwidths defined in, for example, 2.4 GHz band, 5 GHz band and 6 GHz band. The first and second links can belong to the same or different bands. On-off information relating to each link can be formed on the basis of information such as an index or a control field bitmap associated with the operating mode.

12 Claims, 28 Drawing Sheets

(58) Field of Classification Search
USPC .......................................................... 370/329
See application file for complete search history.

(56)             References Cited

FOREIGN PATENT DOCUMENTS

| KR | 10-2015-0069406 |   | 6/2015 |            |
|----|-----------------|---|--------|------------|
| KR | 1020180006841   |   | 1/2018 |            |
| WO | 2005089249      |   | 9/2005 |            |
| WO | WO 2020/027847  | * | 8/2018 | ............ H04W 28/16 |

\* cited by examiner

FIG. 14

| Bits: | 2 | 2 | 4 | 1 | 1 | 1 | 1 | 1 | 1 | 1 | 1 |
|---|---|---|---|---|---|---|---|---|---|---|---|
| | Protocol Version | Type | Sub-type | To DS | From DS | More Fragment | Retry | Power Management | More Data | Protected Frame | Order |
| | 1405 | 1410 | 1415 | 1420 | 1425 | 1430 | 1435 | 1440 | 1445 | 1450 | 1455 |

METHOD AND DEVICE FOR CONTROLLING MULTIPLE LINKS IN WIRELESS LAN SYSTEM SUPPORTING MULTIPLE LINKS

CROSS-REFERENCE TO RELATED APPLICATIONS

This application is the National Stage filing under 35 U.S.C. 371 of International Application No. PCT/KR2019/014096 filed on Oct. 24, 2019, which claims the benefit of U.S. Provisional Application No. 62/750,196 filed on Oct. 24, 2018, the contents of which are all hereby incorporated by reference herein in their entirety.

BACKGROUND OF THE DISCLOSURE

Field of the Disclosure

The present specification relates to a method of controlling at least one link in a wireless local area network (LAN) system supporting a plurality of links, and to a method and apparatus for transmitting control information for at least one link.

Related Art

In many telecommunication systems, communication networks are used to exchange messages between spatially separated devices. Networks can be classified based on geographic scope, which can be, for example, a metropolitan area, a local area or a personal area. These networks will be designated as a wide area network (WAN), metropolitan area network (MAN), local area network (LAN), or personal area network (PAN), respectively. Networks may be variant based on switching/routing techniques used for interconnection of various network nodes and devices (e.g. circuit switched versus packet switched), types of physical media employed for transmission (e.g., wired versus wireless) and used communication protocol sets (e.g., Internet Protocol Suite, Synchronous Optical Networking (SONET), Ethernet, etc.).

Wireless network technologies may include various types of wireless local area networks (WLANs). WLAN employs widely used networking protocols and can be used to interconnect nearby devices together. The various technical features described in the present specification can be applied to any communication standard, such as WiFi or, more generally, any one of the IEEE 802.11 radio protocol family.

For example, various aspects described in the present specification may be used as part of an IEEE 802.11 protocol that supports orthogonal frequency-division multiple access (OFDMA) communications. For example, the IEEE 802.11ax standard proposes an improved communication environment using OFDMA (orthogonal frequency division multiple access) and DL MU downlink multi-user multiple input, multiple output (MIMO) techniques.

The present disclosure proposes technical features that improve the legacy WLAN or that may be utilized in a new communication standard. For example, the new communication standard may be an extreme high throughput (EHT) standard which has lately been under discussion. The EHT standard may use a newly proposed increased bandwidth, an improved physical (PHY) protocol data unit (PPDU) structure, an improved sequence, and a hybrid automatic repeat request (HARQ) technique.

SUMMARY

It is common for a station (STA) based on the existing IEEE 802.11 standard to use one single channel to transmit one packet or frame. Accordingly, the existing STA did not need to transmit a signal through a plurality of channels within a transmission opportunity (TXOP). However, from the IEEE 802.11be standard, multi-link may be supported.

An example according to the present specification proposes a method of transmitting control information related to an operating mode (OM) of an STA, and transmitting/receiving signals based on the control information in a wireless LAN system. Specifically, the control information may include information related to an operating band of the STA and information related to an operating parameter applied to the operating band. Upon receiving the control information, the STA may perform communication based on the control information.

A method performed in a wireless local area network (WLAN) system according to various embodiments is proposed in the present specification. The method may comprises: transmitting, by a first station (STA) supporting multi-links including first and second links, a control field related to an operating mode (OM) of the first STA to a second STA, wherein the control field includes first information related to at least one operating band of the first STA and second information related to an operating parameter applied to the at least one operating band; receiving, by the first STA, a response to the control field from the second STA; and performing, by the first STA, a communication with the second STA based on the first and second information.

Advantageous Effects

According to an example according to the present specification, a receiving STA may set a Network Allocation Vector (NAV) based on the multi-link signal transmitted from a transmitting STA. The receiving STA, which can sense/detect a signal of the transmitting STA through the first link among the multi-links, may set the NAV in the first link. The receiving STA may also set the same NAV in a second link that is different from the first link supported by the receiving STA. While the transmitting STA transmits a signal through the multi-link, the receiving STA may not transmit the signal to the transmitting STA through the second link because the NAV is also set in the second link. Therefore, collision between a transmission signal and a reception signal may not occur in the transmitting STA. According to an example of the present specification, a method for setting an NAV in a multi-link transmission situation may enable efficient signal transmission.

BRIEF DESCRIPTION OF THE DRAWINGS

FIG. 14 is a block diagram showing an example of a frame control field format of a MAC frame.

DESCRIPTION OF EXEMPLARY EMBODIMENTS

The following examples of the present specification may be applied to various wireless communication systems. For example, the following examples of the present specification may be applied to a wireless local area network (WLAN) system. For example, the present specification may be applied to IEEE 802.11a/g/n/ac or IEEE 802.11ax. The present specification may also be applied to a newly proposed EHT standard or IEEE 802.11be. Further, the present specification may be applied to a new WLAN stand which has enhanced IEEE 802.11be.

As used herein, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

As used herein, parentheses may indicate "for example". Specifically, "control information (Signal)" may mean that "Signal" is proposed as an example of "control information". Further, "control information (i.e., signal)" may also mean that "signal" is proposed as an example of "control information".

Hereinafter, technical features of the WLAN system to which the present disclosure may be applied will be described to describe the technical features of the present disclosure.

The WLAN system may perform communication through at least one channel (e.g., 20/40/80/160/320 MHz channels) included in various bands.

Figure 1:
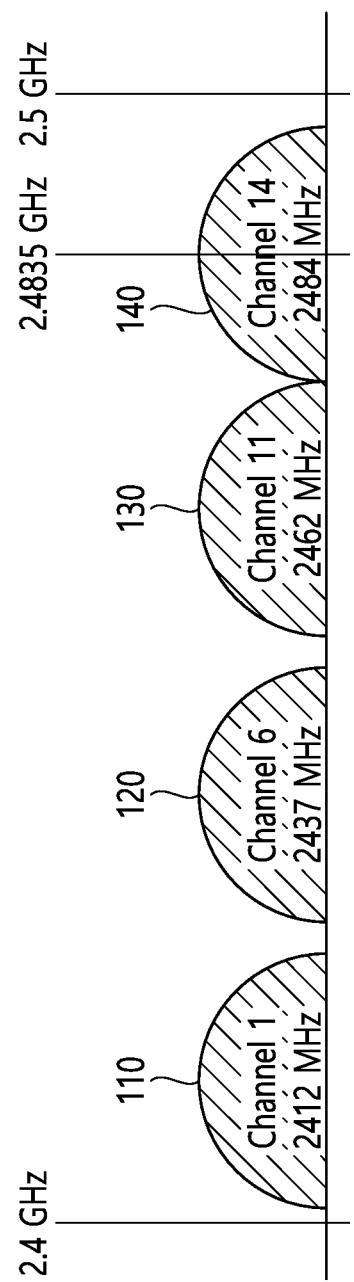
FIG. 1 shows an example of channels used/supported/defined in a 2.4 GHz band.

FIG. 1 shows an example of channels used/supported/defined in a 2.4 GHz band.

The 2.4 GHz band may be referred to by other names such as a first band or the like. In addition, the 2.4 GHz band may refer to a frequency region in which channels with a center frequency adjacent to 2.4 GHz (e.g., channels with a center frequency located in 2.4 to 2.5 GHz) are used/supported/defined.

The 2.4 GHz band may include multiple 20 MHz channels. 20 MHz in the 2.4 GHz band may have multiple channel indexes (e.g., index 1 to index 14). For example, a center frequency of a 20 MHz channel to which channel index 1 is assigned may be 2.412 GHz, a center frequency of a 20 MHz channel to which channel index 2 is assigned may be 2.417 GHz, and a center frequency of a 20 MHz to which channel index N is assigned may be (2.407+0.005*N) GHz. The channel index may be referred to by various names such as channel number. Specific values of the channel index and the center frequency may be changed.

FIG. 1 exemplarily shows four channels in the 2.4 GHz band. Each of the illustrated first to fourth frequency regions 110 to 140 may include one channel. For example, the first frequency region 110 may include channel #1 (a 20 MHz channel having index 1). Here, a center frequency of channel #1 may be set to 2412 MHz. The second frequency region 120 may include channel #6. Here, a center frequency of channel #6 may be set to 2437 MHz. The third frequency region 130 may include channel #11. Here, a center frequency of channel #11 may be set to 2462 MHz. The fourth frequency region 140 may include channel #14. Here, a center frequency of channel #14 may be set to 2484 MHz.

Figure 2:
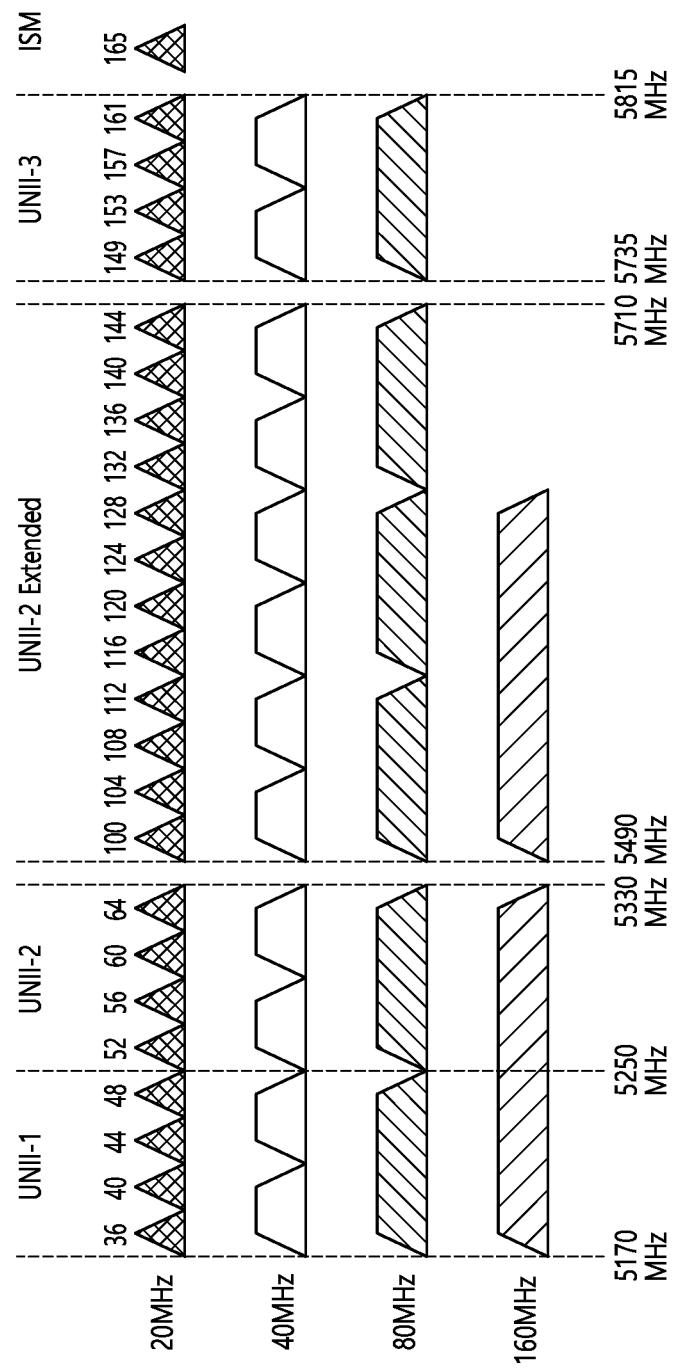
FIG. 2 shows an example of channels used/supported/defined in a 5 GHz band.

FIG. 2 shows an example of channels used/supported/defined in a 5 GHz band.

The 5 GHz band may be referred to by another name such as a second band. The 5 GHz band may refer to a frequency region in which channels having a center frequency of 5 GHz or higher and less than 6 GHz (or less than 5.9 GHz) are used/supported/defined. Alternatively, the 5 GHz band may include a plurality of channels between 4.5 GHz and 5.5 GHz. The specific values shown in FIG. 2 may be changed.

A plurality of channels in the 5 GHz band includes unlicensed national information infrastructure (UNII)-1, UNII-2, UNII-3, and ISM. UNII-1 may be called UNII Low. UNII-2 may include a frequency region called UNII Mid and UNII-2 Extended. UNII-3 may be called UNII-Upper.

A plurality of channels may be set in the 5 GHz band, and a bandwidth of each channel may be variously set to 20 MHz, 40 MHz, 80 MHz, or 160 MHz. For example, the 5170 MHz to 5330 MHz frequency region/range in UNII-1 and UNII-2 may be divided into eight 20 MHz channels. The 5170 MHz to 5330 MHz frequency region/range may be divided into four channels through the 40 MHz frequency region. The 5170 MHz to 5330 MHz frequency region/range may be divided into two channels through the 80 MHz frequency region. Alternatively, the 5170 MHz to 5330 MHz frequency region/range may be divided into one channel through the 160 MHz frequency region.

Figure 3:
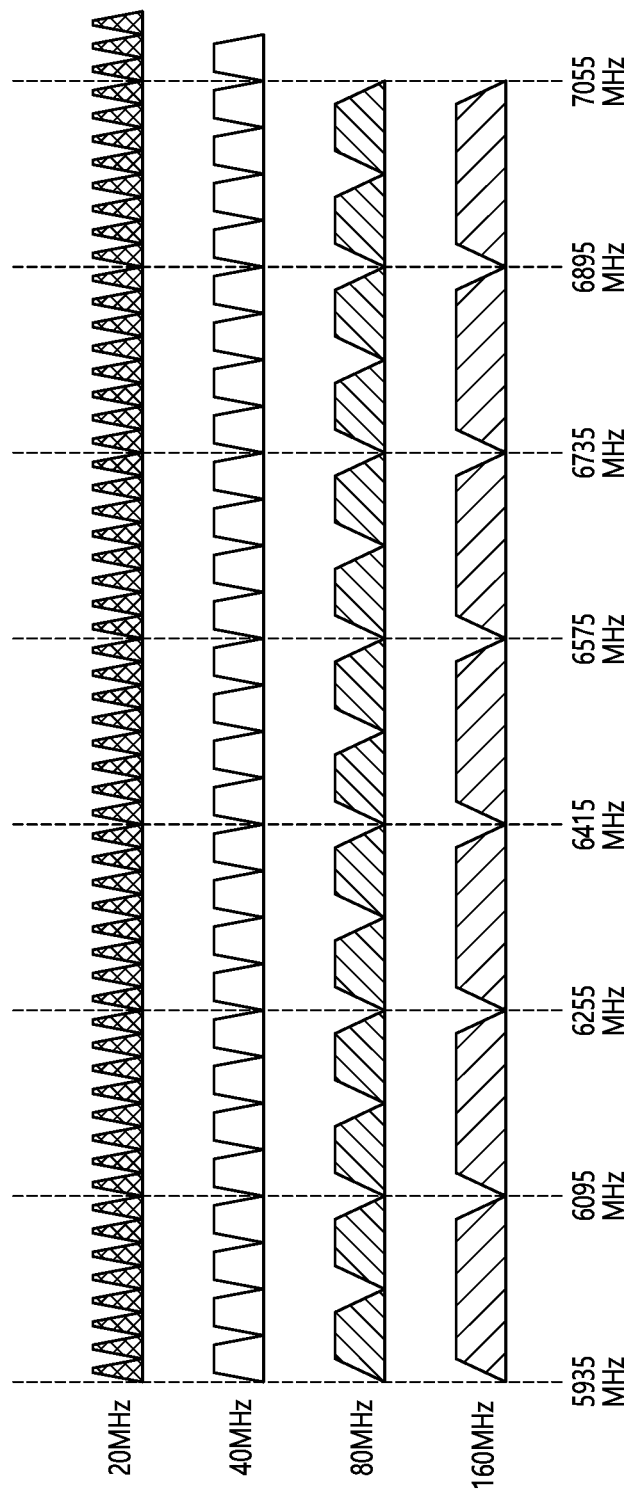
FIG. 3 shows an example of a channel used/supported/defined within a 6 GHz band.

FIG. 3 shows an example of a channel used/supported/defined within a 6 GHz band.

The 6 GHz band may be referred to by other names such as a third band. The 6 GHz band may refer to a frequency region in which channels with a center frequency of 5.9 GHz or higher are used/supported/defined. The specific values shown in FIG. 3 may be changed.

For example, the 20 MHz channel of FIG. 3 may be defined from 5.940 GHz. Specifically, the leftmost channel of the 20 MHz channel of FIG. 3 may have an index #1 (or a channel index, a channel number, etc.), and a center frequency of 5.945 GHz may be allocated. That is, a center frequency of a channel having index #N may be determined as (5.940+0.005*N) GHz.

Accordingly, the indexes (or channel numbers) of the 20 MHz channel of FIG. 3 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, and 233. In addition, according to the aforementioned (5.940+0.005*N) GHz rule, the indexes of the 40 MHz channel of FIG. 3 may be 3, 11, 19, 27, 35, 43, 51, 59, 67, 75, 83, 91, 99, 107, 115, 123, 131, 139, 147, 155, 163, 171, 179, 187, 195, 203, 211, 219, and 227.

In the example of FIG. 3, 20, 40, 80, and 160 MHz channels are shown, but a 240 MHz channel or a 320 MHz channel may be added.

Figure 4:
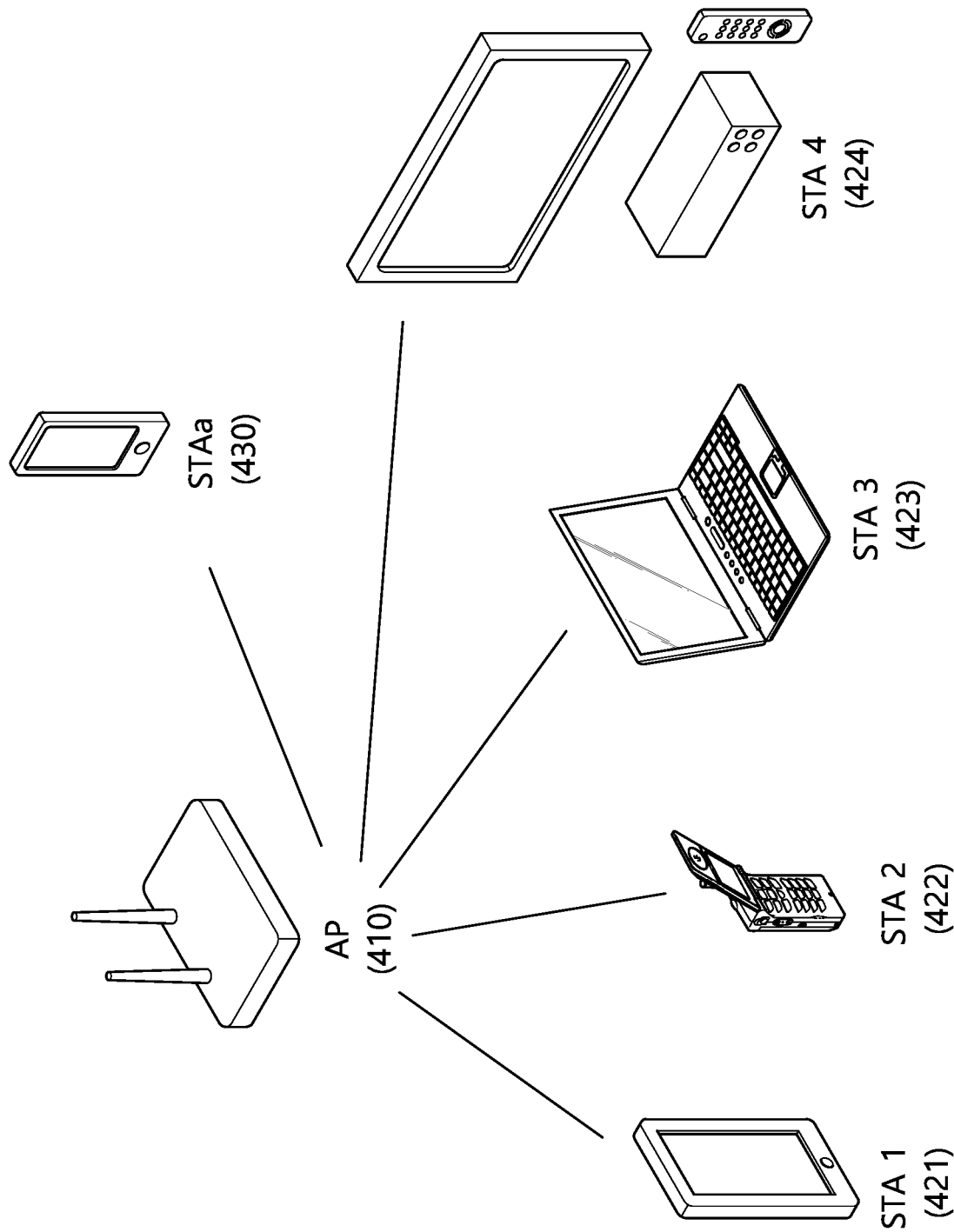
FIG. 4 shows an example of a WLAN system to which the example of the present disclosure may be applied.

FIG. 4 shows an example of a WLAN system to which the example of the present disclosure may be applied.

Referring to FIG. 4, a WLAN system includes one or more basic service sets (BSS). The BSS is a set of stations (STAs) that may be successfully synchronized to communicate with each other.

An infrastructure BSS may include one or more non-AP stations 421, 422, 423, 424, and 430, an access point (AP) 410 providing a distributed service, and a distribution system (DS) connecting a plurality of APs. In the infrastructure BSS, the AP may manage the non-AP STAs in the BSS.

The distribution system may form an extended service set (ESS), which is an extended service set by connecting several BSSs. The ESS may be used as a term indicating one network formed by connecting one or several APs through a distribution system. APs included in one ESS may have the same service set identification (SSID).

A portal may serve as a bridge for connecting a wireless LAN network (IEEE 802.11) and another network (e.g., 802.X).

The STAs may establish a network to perform communication, without the AP. Such a network may be referred to as an ad-hoc network or an independent basic service set (IBSS).

Figure 5:
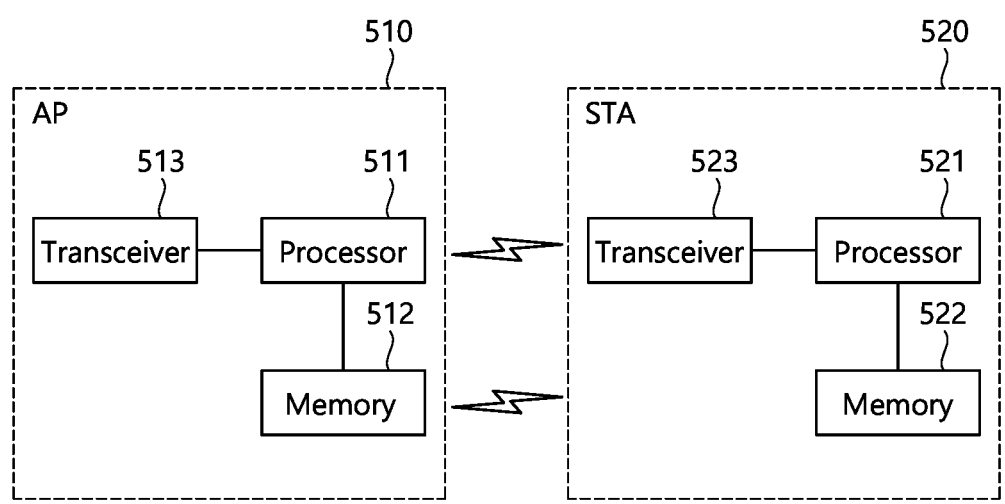
FIG. 5 shows an example of a station included in a WLAN system.

FIG. 5 shows an example of a station included in a WLAN system.

An example of the present disclosure may be performed by the device of FIG. 5.

In an example of the present disclosure, an STA may refer to an AP STA 510 and/or a non-AP STA 520. That is, the STAs 510 and 520 may be used as having a meaning including both an AP and a non-AP STA and, in a broad sense, as a certain function al medium including a medium access control (MAC) according to the regulations of the IEEE 802.11 standard and a physical layer interface for a wireless medium.

The non-AP STA 520 may be referred to by various names such as a mobile terminal, a wireless device, a wireless transmit/receive unit (WTRU), a user equipment (UE), a mobile station (MS), a mobile subscriber unit, or simply, a user.

Referring to FIG. 5, the AP STA 510 may include a processor 511, a memory 512, and a transceiver 513. The illustrated processor, memory, and transceiver may each be implemented as separate chips or at least two or more blocks/functions may be implemented through a single chip.

The transceiver 513 of the AP performs a signal transmission/reception operation. Specifically, IEEE 802.11 packets (e.g., IEEE 802.11a/b/g/n/ac/ax/be, etc.) may be transmitted and received.

The processor 511 of the AP may perform an intended operation of the AP. For example, the processor 511 of the AP may receive a signal through the transceiver 513, process the received signal, generate a transmission signal, and perform control for signal transmission. The memory 512 of the AP may store a signal (i.e., a received signal) received through the transceiver 513 and store a signal (i.e., a transmission signal) to be transmitted through the transceiver.

A transceiver 523 of the non-AP STA performs a signal transmission/reception operation. Specifically, the non-AP STA may transmit and receive IEEE 802.11 packets (e.g., IEEE 802.11a/b/g/n/ac/ax/be, etc.).

A processor 521 of the non-AP STA may perform an intended operation of the AP. For example, the processor 521 of the non-AP STA may receive a signal through the transceiver 523, process the received signal, generate a transmission signal, and perform control for signal transmission. A memory 522 of the non-AP STA may store a signal (i.e., a received signal) received through the transceiver 523 and store a signal (i.e., a transmission signal) to be transmitted through the transceiver.

Figure 6:
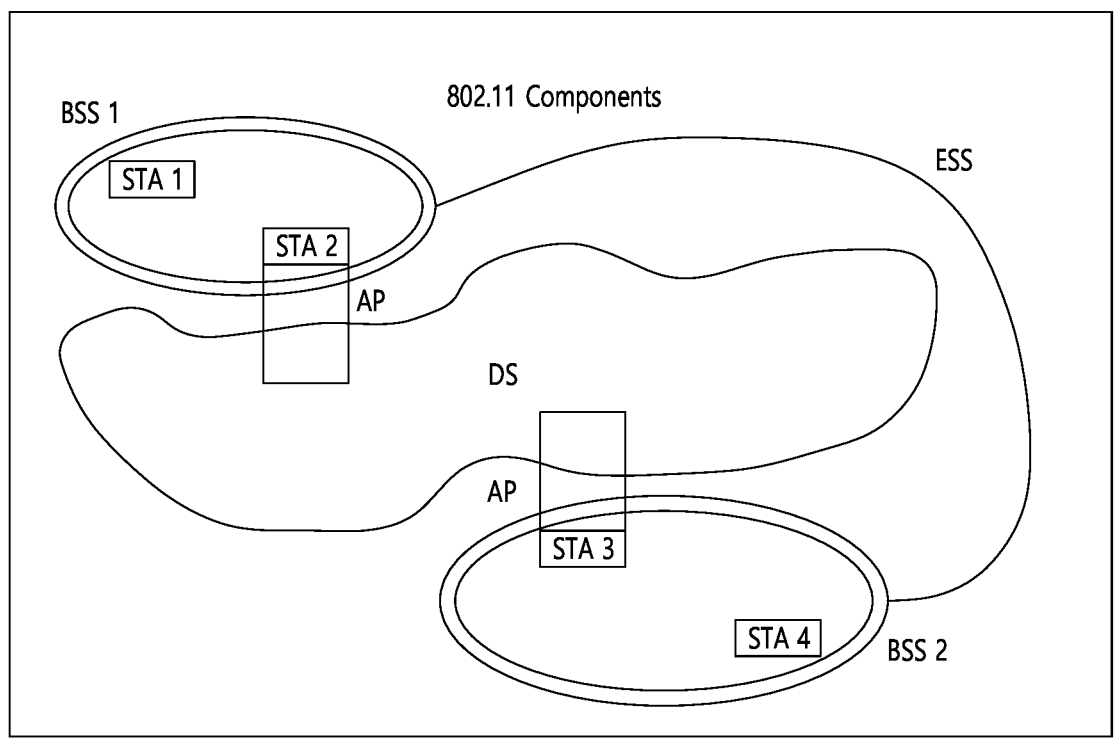
FIG. 6 shows an example of a WLAN system.

FIG. 6 shows an example of a WLAN system.

As shown, the WLAN system includes at least one access point (AP) and a plurality of STAs associated with the AP.

A plurality of STAs shown in FIG. 6 may configure a basic service set (BSS).

The BSS may refer to a set of APs and STAs, such as APs and STAs that may be successfully synchronized to communicate with each other. The BSS may include one or more STAs that may be combined with an AP.

The BSS may include at least one STA, APs providing a distribution service, and a distribution system (DS) connecting multiple APs.

The distribution system may implement an extended service set (ESS) extended by connecting the multiple BSSs. The ESS may be used as a term indicating one network configured by connecting one or more APs through the distribution system. The AP included in one ESS may have the same service set identification (SSID).

A portal may serve as a bridge which connects the wireless LAN network (IEEE 802.11) and another network (e.g., 802.X).

Figure 7:
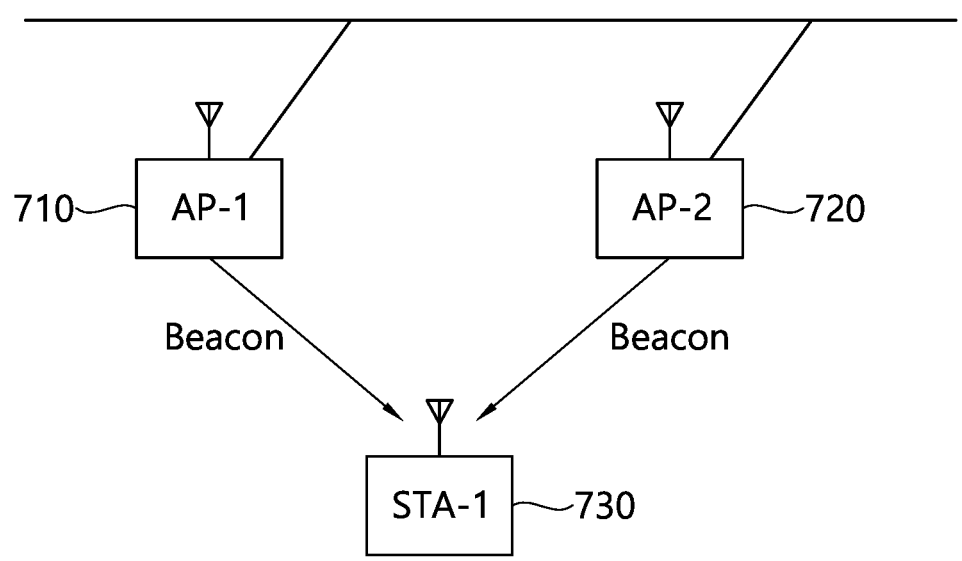
FIG. 7 illustrates an example of network discovery.

FIG. 7 illustrates an example of network discovery.

In order to access the WLAN network, the STA should perform network discovery. Such discovery may be performed through a scanning process for a network. The scanning method may be divided into active scanning and passive scanning.

The example of FIG. 7 may be related to passive scanning.

Specifically, AP-1 710 and AP-2 720 may transmit a beacon frame during a preset time period. An STA 730 may receive information related to an AP and/or a WLAN system through the received beacon frame.

The beacon frame is an example of a management frame in IEEE 802.11. The beacon frame may be transmitted periodically. An STA performing scanning based on passive scanning may receive a beacon frame, while shifting channels. Upon receiving the beacon frame, the STA 730 may store BSS-related information included in the received beacon frame, shift to a next channel, and perform passive scanning in the next channel.

Figure 8:
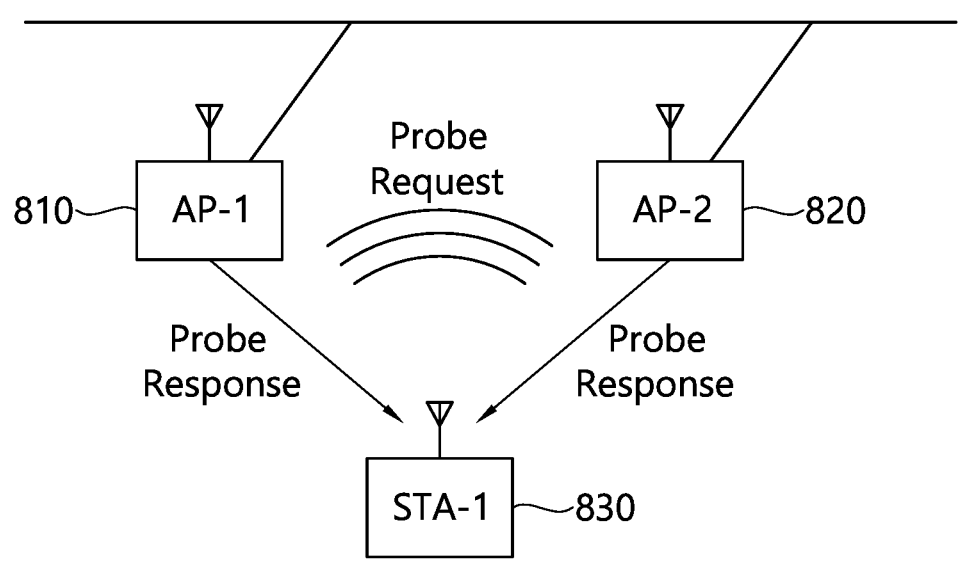
FIG. 8 shows another example of network discovery.

FIG. 8 shows another example of network discovery.

The example of FIG. 8 may be related to active scanning.

As illustrated in FIG. 8, the STA 830 that performs active scanning may transmit a probe request frame to search for an AP 810, 820 present in the vicinity, while changing channels, and wait for a response thereto. A responder may transmit a probe response frame to the STA that has transmitted the probe request frame in response to the probe request frame. The responder may be an STA that last transmitted a beacon frame in a BSS of the channel being scanned. In the BSS, since an AP transmits a beacon frame, the AP becomes a responder, and in an IBSS, since STAs in the IBSS transmit beacon frames by taking turns, the responder may be changed.

When the STA transmits the probe request frame through channel #1 and receives the probe response frame through channel #1, the STA may store BSS-related information included in the received probe response frame, move to a next channel (e.g., channel #2), and repeat scanning in the same manner.

Figure 9:
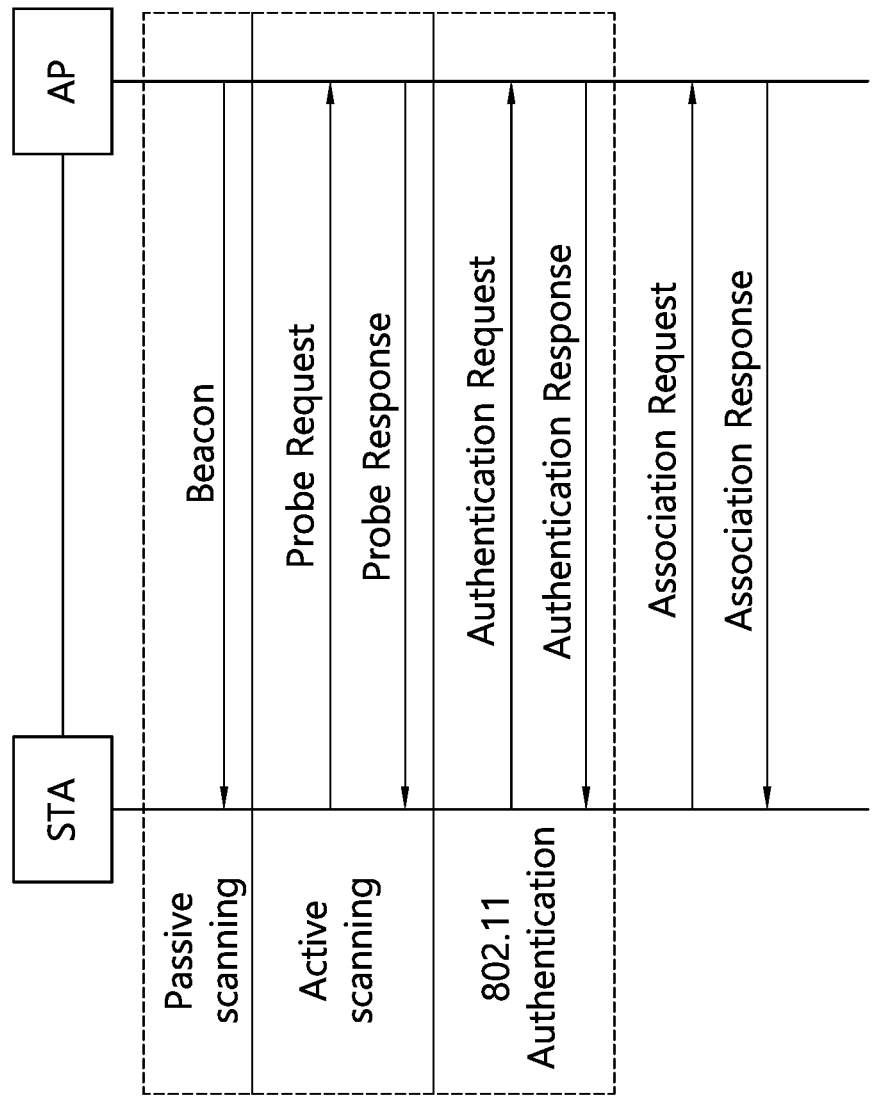
FIG. 9 shows an example of scanning and subsequent operations.

FIG. 9 shows an example of scanning and subsequent operations.

The example of FIG. 9 may be performed based on FIGS. 7 and 8. That is, the user STA may receive the beacon frame of FIG. 7. Alternatively, the user STA may transmit a probe request frame and receive a probe response frame as shown in FIG. 8.

Thereafter, an authentication process as shown in FIG. 9 may be performed. For example, the STA may transmit an authentication request frame to the AP, and in response thereto, the AP may transmit an authentication response frame to the STA. An authentication frame used for authentication request/response corresponds to a management frame.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

Figure 10:
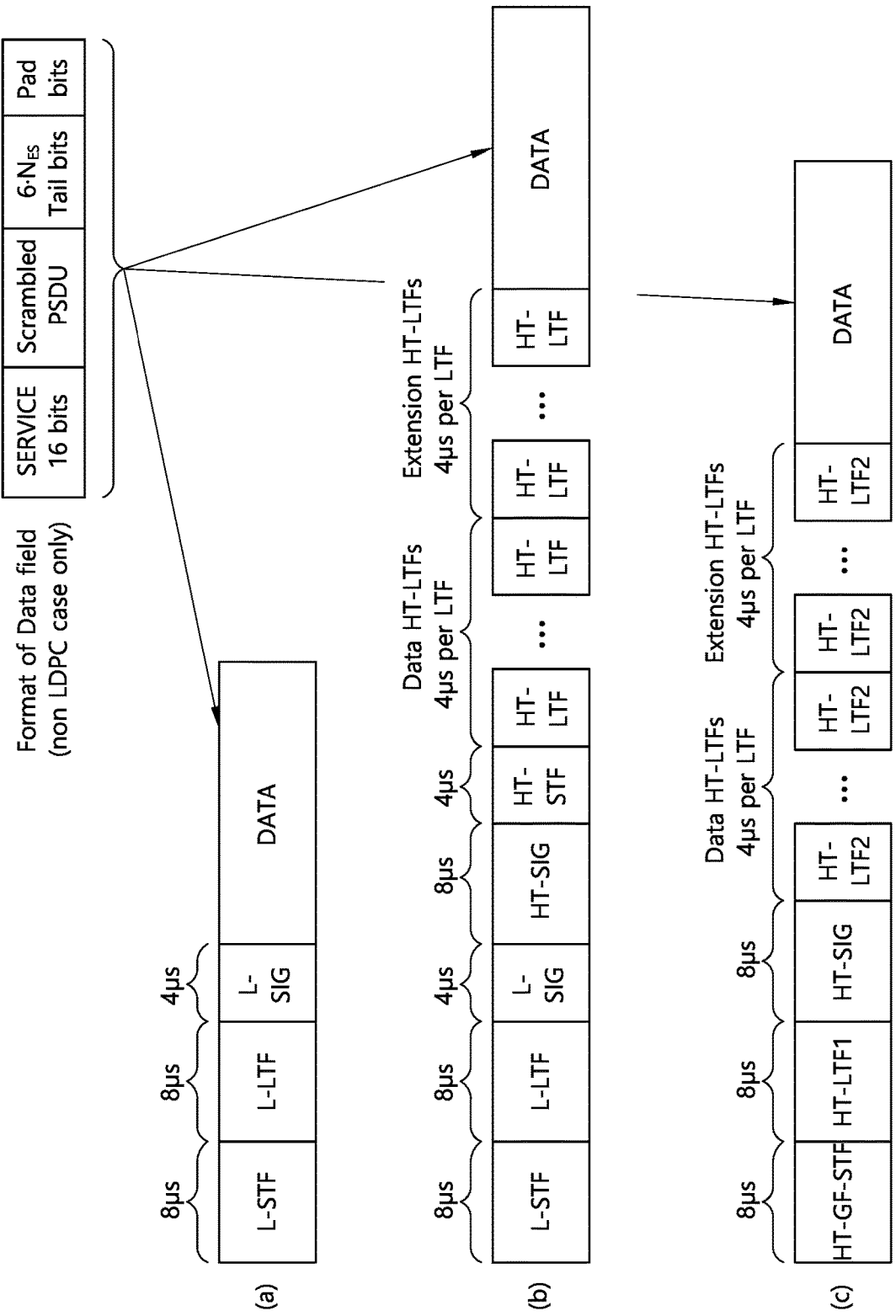
FIG. 10 shows an example of a PPDU used in a legacy WLAN system.

FIG. 10 shows an example of a PPDU used in a legacy WLAN system.

Sub-figure (a) of FIG. 10 shows an example of a PPDU used in the IEEE 802.11a/g standard.

Sub-figure (b) of FIG. 10 shows an example of a PPDU used in the IEEE 802.11n standard.

Sub-figure (c) of FIG. 10 shows another example of a PPDU used in the IEEE 802.11n standard.

In general, the PPDU may include a short training field (STF). STF may be embodied as L L-STF, HT-STF, VHT-STF, HE-STF, EHT-STF, etc. used in the example of FIG. 10 or an additional example. STF may be used for frame detection, automatic gain control (AGC), diversity detection, coarse frequency/time synchronization, and the like.

A typical PPDU may include a long training field (LTF) 520. The LTF may be embodied as L-LTF, HT-LTF, VHT-LTF, HE-LTF, EHT-LTF, etc. used in the example of FIG. 10 or an additional example. LTF may be used for frequency/time synchronization and channel estimation.

A typical PPDU may include an SIG. The SIG may be embodied as L-SIG, HT-SIG, VHT-SIG, HE-SIG, EHT-SI, etc. used in the example of FIG. 10 or an additional example. The SIG may include control information for decoding the PPDU.

A typical PPDU may include a data field. The data field may be included in the example of FIG. 10 or an additional example. As illustrated in FIG. 10, the data field may include a SERVICE field, a physical layer service data unit (PSDU), a PPDU TAIL bit, and a padding bit. Some bits of the SERVICE field may be used for synchronization of a descrambler at a receiving end. The PSDU corresponds to a MAC protocol data unit (MPDU) defined in a MAC layer and may include data generated/used in a higher layer. The PPDU TAIL bit may be used to return an encoder to a zero (0) state. The padding bit may be used to adjust a length of the data field in a predetermined unit.

Figure 11:
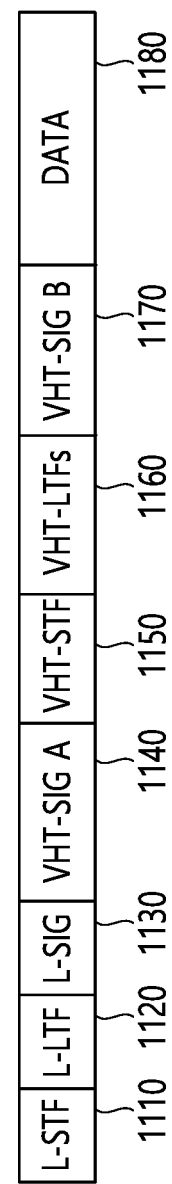
FIG. 11 shows another example of a PPDU according to a legacy WLAN standard.

FIG. 11 shows another example of a PPDU according to a legacy WLAN standard.

FIG. 11 shows an example of a PPDU according to the IEEE 802.11ac standard (i.e., VHT standard). The illustrated common fields include the legacy L-STF 1110, L-LTF 1120, and L-SIG 1130, and also include a VHT-SIG-A field 1140 newly proposed in the IEEE 802.11ac standard. The PPDU of FIG. 11 may be used in both single user (SU) communication in which a signal is transmitted from an AP to one user STA and multi-user (MU) communication in which a signal is transmitted from an AP to a plurality of user STAs. When MU communication is performed, the VHT-SIG-A field 1140 includes common control information commonly applied to all receiving STAs.

When the PPDU of FIG. 11 is used for MU communication, VHT-STF 1150, VHT-LTF 1160, VHT-SIG-B 1170, and data fields 1180 are configured as per-user fields.

The VHT-STF 1150 is an STF field newly proposed in the VHT standard (i.e., IEEE 802.11ac), and the VHT-LTF 1160 is an LTF field newly proposed in the VHT standard. The VHT-SIG-B 1170 includes information for decoding the data field 1180 and may be individually configured for each receiving STA.

The PPDU of FIG. 11 may be transmitted to a plurality of STAs based on a multi-user multiple input, multiple output (MU-MIMO) technique. In addition, it may be transmitted to one STA based on the SU-MIMO technique.

Figure 12:
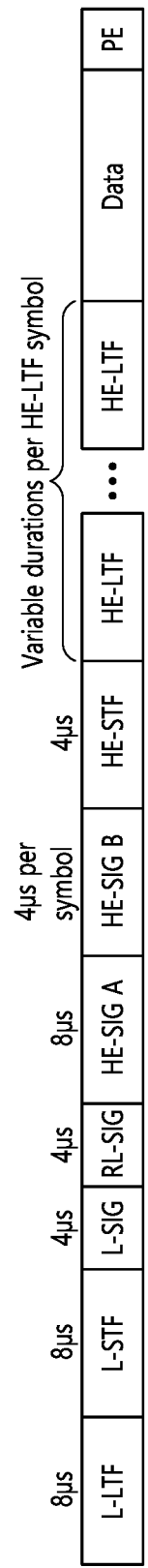
FIG. 12 is a diagram showing another example of an HE-PPDU.

FIG. 12 is a diagram showing another example of an HE-PPDU.

The example of FIG. 12 may be applied to an IEEE 802.11ax or high efficiency (HE) WLAN system. Four PPDU formats according to IEEE 802.11ax, are defined and an example of FIG. 12 is an example of MU-PPDU used for MU communication. However, some of the technical features applied to the field shown in FIG. 12 may be used as it is for SU communication or UL-MU communication.

The technical features of the HE-PPDU shown in FIG. 12 may be applied to a newly proposed EHT-PPDU. For example, technical features applied to HE-SIG may also be applied to EHT-SIG, and technical features applied to HE-STF/LTF may also be applied to EHT-SFT/LTF.

The L-STF of FIG. 12 may include a short training orthogonal frequency division multiplexing symbol (OFDM symbol). The L-STF may be used for frame detection, automatic gain control (AGC), diversity detection, and coarse frequency/time synchronization.

The L-LTF of FIG. 12 may include a long training orthogonal frequency division multiplexing symbol (OFDM). L-LTF may be used for fine frequency/time synchronization and channel prediction.

The L-SIG of FIG. 12 may be used to transmit control information. The L-SIG may include information related to a data rate and data length. In addition, the L-SIG may be repeatedly transmitted. That is, it may be configured in a format in which L-SIG is repeated (e.g., it may be referred to as R-LSIG).

HE-SIG-A of FIG. 12 may include control information common to a receiving station.

Specifically, the HE-SIG A may include 1) a DL/UL indicator, 2) a BSS color field which is an identifier of a BSS, 3) a field indicating a remaining time of a current TXOP section, 4) a bandwidth field indicating 20, 40, 80, 160, 80+80 MHz, 5) a field indicating an MCS scheme applied to an HE-SIG B, 6) a field indicating whether the HE-SIG B is modulated according to a dual subcarrier modulation technique for MCS, 7) a field indicating the number of symbols used for the HE-SIG B, 8) a field indicating whether the HE-SIG B is generated over the entire band, 9) a field indicating the number of symbols of the HE-LTF, 10) a field indicating a length of the HE-LTF and a CP length, 11) a field indicating whether there is an additional OFDM symbol for LDPC coding, 12) a field indicating control information related to packet extension (PE), and 13) a field indicating information related to a CRC field of the HE-SIG A. These specific fields of the HE-SIG A may be added or some of them may be omitted. In addition, in environments other than a multi-user (MU) environments, some fields in the HE-SIG-A may be added or omitted.

As described above, the HE-SIG B of FIG. 12 may be included only in the case of a PPDU for multiple users (MU). Basically, the HE-SIG A or the HE-SIG B may include resource allocation information (or virtual resource allocation information) for at least one receiving STA.

An HE-STF of FIG. 12 may be used to improve automatic gain control estimation in a multiple input multiple output (MIMO) environment or an OFDMA environment.

An HE-LTF of FIG. 12 may be used to estimate a channel in the MIMO environment or the OFDMA environment.

A size of fast Fourier transform (FFT)/inverse fast Fourier transform (IFFT) applied to the HE-STF and a field after the HE-STF of FIG. 12 may be different from a size of the FFT/IFFT applied to the field before the HE-STF. For example, the size of the FFT/IFFT applied to the HE-STF and the field after the HE-STF may be 4 times larger than the size of the FFT/IFFT applied to the field before the HE-STF.

For example, when at least one field among L-STF, L-LTF, L-SIG, HE-SIG A, and HE-SIG B on the PPDU of FIG. 12 is referred to as a first field/part, at least one of a data field, HE-STF, and HE-LTF may be referred to as a second field/part. The first field may include a field related to the legacy system, and the second field may include a field related to an HE system. In this case, the size of FFT/IFFT may be defined as N times the size of FFT/IFFT used in the legacy WLAN system (N is a natural number, e.g., N=1, 2, and 4). That is, FFT/IFFT having a size of N (=4) times may be applied to the second field of the HE PPDU, compared to the first field of the HE PPDU. For example, 256 FFT/IFFT may be applied for a bandwidth of 20 MHz, 512 FFT/IFFT may be applied for a bandwidth of 40 MHz, 1024 FFT/IFFT is applied for a bandwidth of 80 MHz, and 2048 FFT/IFFT may be applied for a continuous or discontinuous bandwidth of 160 MHz.

In other words, subcarrier spacing may have a size of 1/N times subcarrier spacing used in the legacy WLAN system (N is a natural number, for example, when N=4, 78.125 kHz). That is, subcarrier spacing having a size of 312.5 kHz which is legacy subcarrier spacing may be applied to the first field/part of the HE PPDU, and subcarrier spacing having a size of 78.125 kHz may be applied to the second field/part of the HE PPDU.

Alternatively, an IDFT/DFT period applied to each symbol of the first field may be expressed to be N (=4) times shorter than the IDFT/DFT period applied to each data symbol of the second field. That is, a length of IDFT/DFT applied to each symbol of the first field of the HE PPDU may be expressed as 3.2 μs, and a length of IDFT/DFT applied to each symbol of the second field of the HE PPDU may be expressed as 3.2 μs*4 (=12.8 μs). A length of an OFDM symbol may be a value obtained by adding a length of a guard interval (GI) to the length of the IDFT/DFT. The length of the GI may be various values such as 0.4 μs, 0.8 μs, 1.6 μs, 2.4 μs, and 3.2 μs.

As described above, the technical features in which subcarrier spacing of different sizes is applied to one PPDU may also be applied to the EHT-PPDU as it is. That is, subcarrier spacing having a size of 312.5 kHz may be applied to the first field/part of the EHT-PPDU, and subcarrier spacing having a size of 78.125 kHz may be applied to the second field/part of the EHT PPDU. The first field/part of the EHT-PPDU may include L-LTF, L-STF, L-SIG, EHT-SIG-A, and/or EHT-SIG-B. In addition, the second field/part of the EHT-PPDU may include EHT-STF, EHT-LTF, and/or a data field. The classification of the first part/second part of the EHT-PPDU may be changed.

Figure 13:
FIG. 13 shows an example of a MAC frame.

FIG. 13 shows an example of a MAC frame.

The MAC frame of FIG. 13 may be included in a data field (i.e., MPDU) of a PPDU presented herein.

Referring to FIG. 13, a MAC frame 1300 includes a frame control field 1310, a duration/ID (duration/ID) field 1320, an address 1 field 1331, an address 2 field 1332, an address 3 field 1333, a sequence control field 1340, an address 4 field 1334, a QoS control field 1350, an HT control field 1360, a frame body 1370, and a frame check sequence (FCS) field 1380.

The frame control field 1310 includes information related to frame characteristics. A specific structure of the frame control field 1310 is shown in FIG. 14.

The duration/ID field 1320 may be implemented to have different values according to a type and a subtype of the frame 1300. When the type and subtype of the frame 1300 are a PS-poll frame for power save operation, the duration/ID field 1320 may be set to include an AID of an STA that transmitted the frame 1300. In other cases, the duration/ID field 1320 may be set to have a specific duration value according to the frame 1300 type and subfield. When the frame 1300 is an MPDU included in the A-MPDU format, the duration/ID field 1320 included in the MAC header of each MPDU may all be implemented to have the same value.

The address 1 field to address 4 field 1331 to 1334 may be set to implement specific fields among a BSSID field indicating a BSSID, a source address (SA) field indicating an SA, a destination address (DA) field indicating a DA, a transmitting address (TA) field indicating a transmitting STA address, and a receiving address (RA) field indicating a receiving STA address. Meanwhile, the address field implemented as the TA field may be set as a bandwidth signaling TA value, and in this case, the TA field may indicate that the frame includes additional information in the scrambling sequence. The bandwidth signaling TA may be expressed as a MAC address of the STA that transmits the corresponding frame, but an individual/group bit included in the MAC address may be set to a specific value, for example, 1.

The sequence control field 1340 is set to include a sequence number and a fragment number. The sequence number may indicate a sequence number allocated to the frame 1300. The fragment number may indicate the number of each fragment of the frame 1300.

The QoS control field 1350 includes information related to QoS.

The HT control field 1360 includes control information related to an HT scheme/EHT scheme.

The frame body 1370 may include data to be transmitted by the transmitting STA and/or the AP. In the frame body 1370, a body component excluding a MAC header and an FCS in a control frame, a management frame, an action frame, and/or a data frame to be transmitted may be implemented. When the frame 1300 is a management frame and/or an action frame, information elements included in the management frame and/or an action frame may be implemented in the frame body 1370.

The FCS field 1380 includes a bit sequence for CRC.

FIG. 14 is a block diagram showing an example of a frame control field format of a MAC frame.

Referring to FIG. 14, a frame control field 1400 includes a protocol version subfield 1405, a type subfield 1410, a subtype subfield 1415, and a To DS subfield 1420, a From DS subfield 1425, a More Fragment subfield 1430, a Retry subfield 1435, a Power Management subfield 1440, a More Data subfield 1445, a Protected Frame subfield 1450, and an Order subfield 1455.

The protocol version subfield 1405 may be set to indicate a version of a wireless LAN protocol applied to a corresponding MAC frame.

The type sub-field 1410 and the sub-type sub-field 1415 may be set to indicate information identifying a function of a frame including the corresponding frame control field 1400.

The To DS subfield 1420 and the From DS subfield 1425 may be determined according to a preset rule. For example, for a data frame directly transmitted from one STA to another STA in the same IBSS, a first value may be assigned to the To DS subfield 1420 and the From DS subfield 1425.

The More Fragment subfield 1430 may be set to indicate whether there is a fragment to be transmitted following the corresponding MAC frame.

The Retry Subfield 1435 may be set to indicate whether the corresponding MAC frame is based on retransmission of a previous frame.

The Power Management subfield 1440 may be set to indicate a power management mode of the STA.

The More Data subfield 1445 may be set to indicate whether a frame to be additionally transmitted exists.

The Protected Frame subfield 1450 may be set to include information indicating whether a frame body part has been processed by the encryption encapsulation algorithm.

Hereinafter, a resource unit (RU) used in the PPDU will be described. The resource unit may include a plurality of subcarriers (or tones). The RU may be used to transmit signals to multiple STAs based on an OFDMA technique. Also, an RU may be defined even when a signal is transmitted to one STA. The RU may be used for STF, LTF, data fields, and the like.

OFDMA communication based on an RU may be applied to the HE-PPDU shown in FIG. 12. That is, the RU described below may be applied to HE-STF, HE-LTF and data fields generated according to HE standards.

Figure 15:
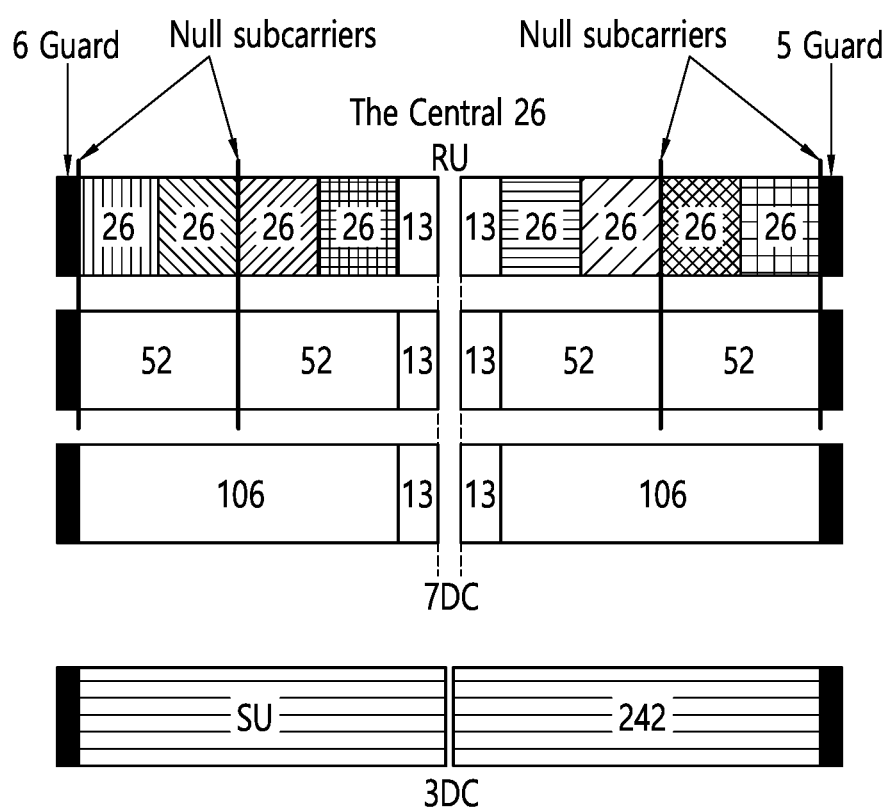
FIG. 15 is a diagram showing an arrangement of RUs used in a 20 MHz band.

FIG. 15 is a diagram showing an arrangement of RUs used in a 20 MHz band.

As shown in FIG. 15, resource units (RUs) corresponding to different numbers of tones (i.e., subcarriers) may be used to configure some fields of the HE-PPDU. For example, resources may be allocated in units of RUs shown for HE-STF, HE-LTF, and data fields.

As shown at the top of FIG. 15, 26-units (i.e., units corresponding to 26 tones) may be disposed. In the leftmost band of the 20 MHz band, 6 tones may be used as a guard band, and in the rightmost band of the 20 MHz band, 5 tones may be used as a guard band. In addition, 7 DC tones are inserted at a center band, that is, the DC band, and 26 units corresponding to 13 tones may exist on the left and right sides of the DC band. In addition, 26 units, 52 units, and 106 units may be allocated to other bands. Each unit may be assigned for a receiving station, i.e. a user.

Meanwhile, the RU arrangement of FIG. 15 is utilized not only in a situation for a plurality of users (MU), but also in a situation for a single user (SU). In this case, one 242-unit may be used, and in this case 3 DC tones may be inserted.

In the example of FIG. 15, RUs of various sizes, that is, 26-RU, 52-RU, 106-RU, 242-RU, etc., have been proposed. Since a specific size of the RUs may be expanded or increased, the embodiment is not limited to the specific size of each RU (i.e., the number of corresponding tones).

Figure 16:
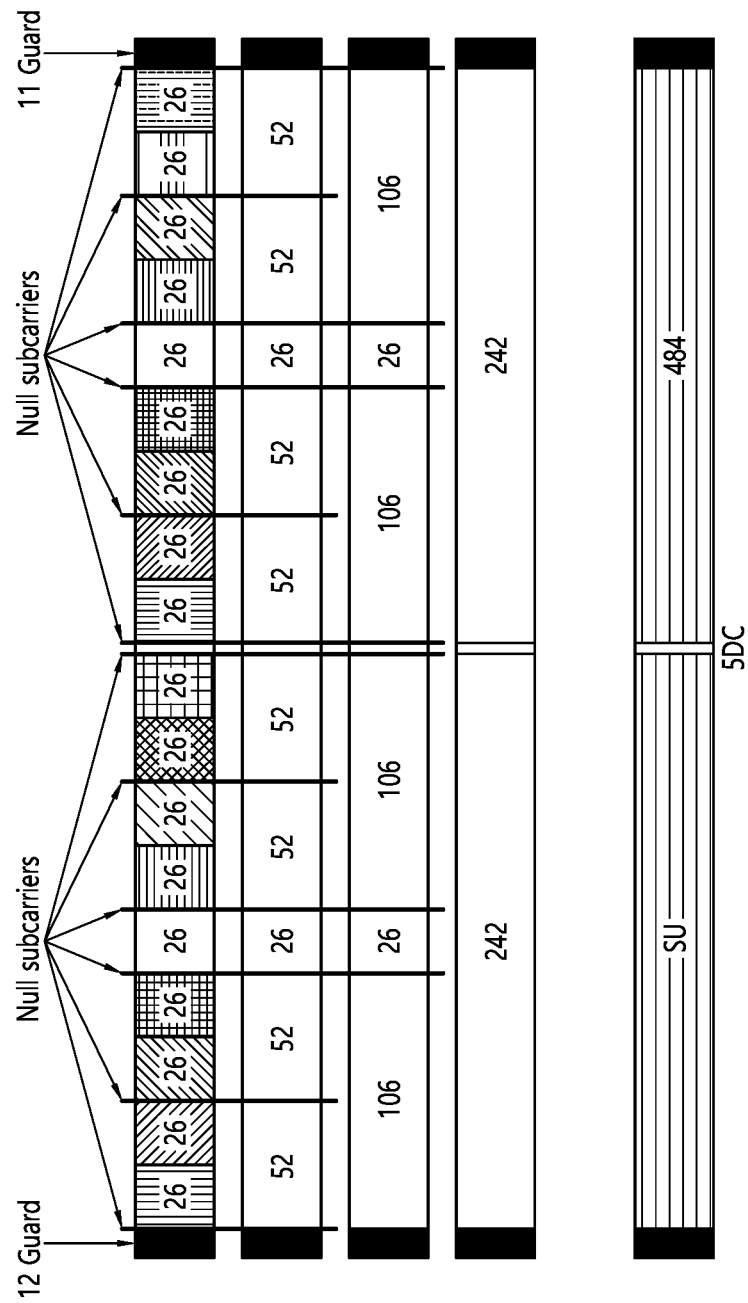
FIG. 16 is a diagram showing an arrangement of a resource unit (RU) used in a 40 MHz band.

FIG. 16 is a diagram showing an arrangement of a resource unit (RU) used in a 40 MHz band.

Similar to the use of RUs having various sizes in the example of FIG. 15, 26-RU, 52-RU, 106-RU, 242-RU, 484-RU, and the like may be used in the example of FIG. 16. In addition, 5 DC tones may be inserted into a center frequency, 12 tones may be used as a guard band at the leftmost band of the 40 MHz band, and 11 tones may be used as a guard band at the rightmost band of the 40 MHz band.

Also, as shown, when used for a single user, a 484-RU may be used. Meanwhile, the fact that the specific number of the RUs can be changed is the same as the example of FIG. 15.

Figure 17:
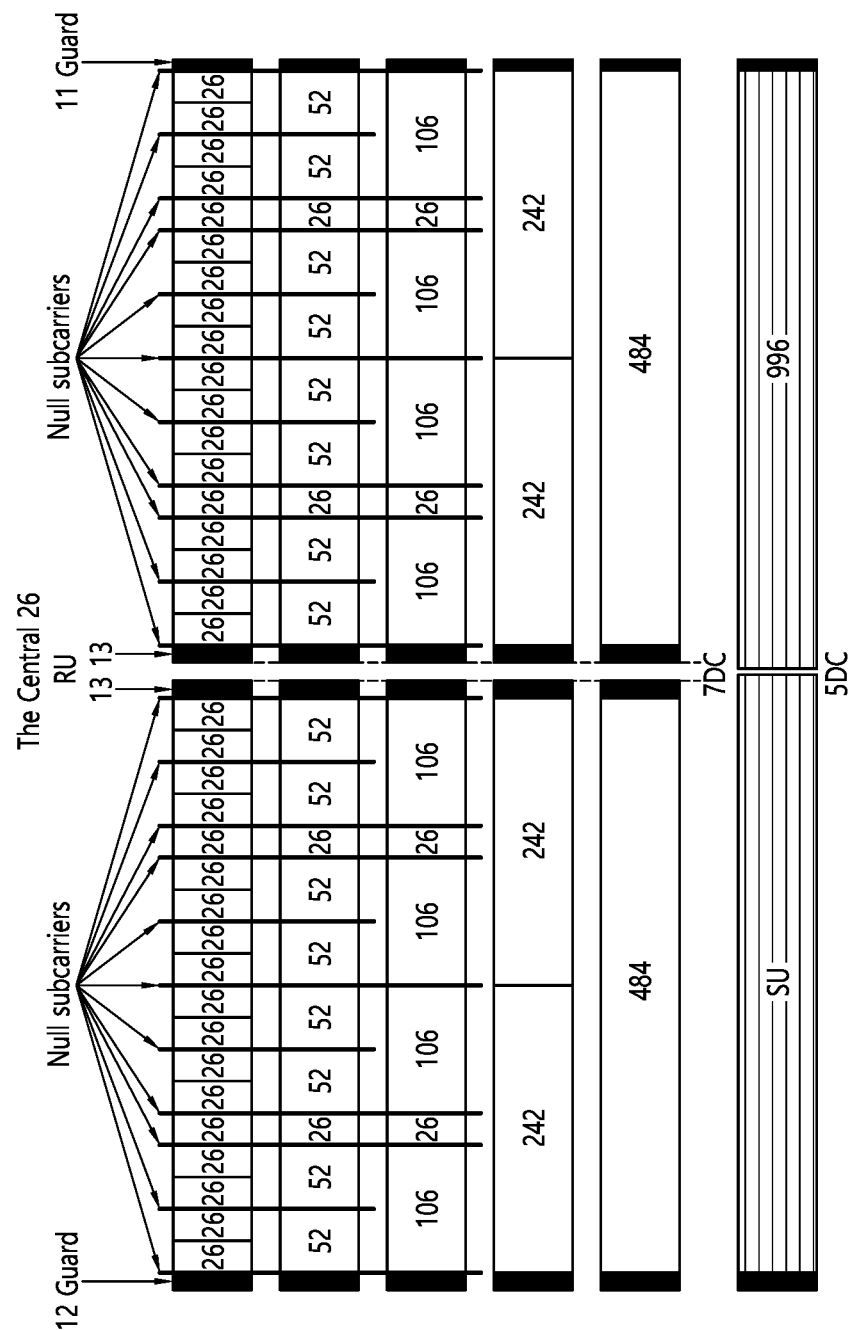
FIG. 17 is a view showing an arrangement of RUs used in an 80 MHz band.

FIG. 17 is a view showing an arrangement of RUs used in an 80 MHz band.

Figure 26:
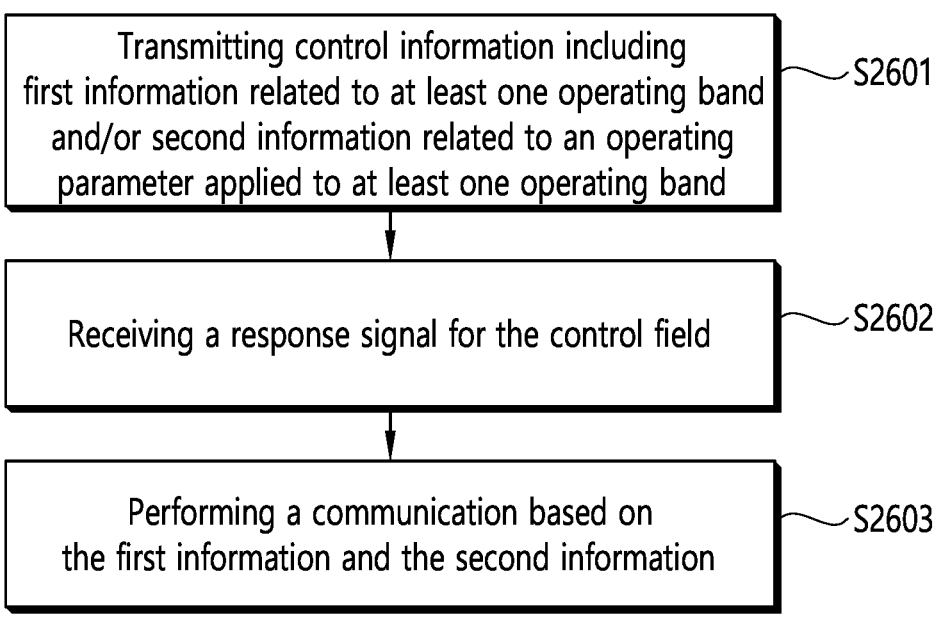
FIG. 26 is a flowchart illustrating an embodiment of an operation of a second STA (e.g., an AP or a non-AP STA) according to FIG. 23.

Similar to the use of RUs having various sizes in the examples of FIGS. 15 and 16, 26-RU, 52-RU, 106-RU, 242-RU, 484-RU, 996-RU, etc. may also be used in the example of FIG. 17. In addition, 7 DC tones may be inserted into a center frequency, 12 tones may be used as a guard band at the leftmost band of the 80 MHz band, and 11 tones may be used as a guard band at the rightmost band of the 80 MHz band. In addition, a 26-RU using 13 tones located on the left and right of the DC band may be used.

Further, as shown, when used for a single user, a 996-RU may be used, and in this case, 5 DC tones may be inserted.

Meanwhile, the fact that the specific number of the RUs is changed is the same as those of FIGS. 15 and 16.

The RUs shown in FIGS. 15 to 17 may be used for OFDMA-based communication. That is, any one RU (26/52/106/242-RU, etc.) shown in FIGS. 15 to 17 may be allocated to any one STA, and the other RU may be allocated to another STA. That is, MU communication is possible by allocating the RUs shown in FIGS. 15 to 17 to a plurality of STAs. MU communication may be applied to downlink communication as well as to uplink communication.

A station (e.g., an AP and/or a non-AP STA) of the present specification may support multilink communication. A station (STA) supporting multilink communication may simultaneously perform communication through a plurality of links. That is, the STA supporting multilink communication may perform communication through a plurality of links during the first time period, and may perform communication through only one of the plurality of links during the second time period.

Multilink communication may mean communication supporting a plurality of links, and one link can include a channel (for example, 20/40/80/160/240/320 MHz channels) defined in a 2.4 GHz band, a 5 GHz band, a 6 GHz band, and/or a specific band described below. Hereinafter, the concept of conventional channel bonding will be described.

For example, in the IEEE 802.11n system, 40 MHz channel bonding may be performed by combining two 20 MHz channels. In addition, 40/80/160 MHz channel bonding may be performed in the IEEE 802.11ac system.

For example, an STA may perform a channel bonding for a primary 20 MHz channel (P20 channel) and a secondary 20 MHz channel (S20 channel). In the channel bonding process, a backoff count/counter may be used. The backoff count value is selected to be a random value and may be decreased during a backoff interval. In general, when the backoff count value becomes 0, the STA is able to attempt to access the channel.

When the P20 channel is determined to be in the idle state during the backoff interval and the backoff count value for the P20 channel becomes 0, an STA performing the channel bonding determines whether the S20 channel has been maintained to be idle for a certain period (e.g., point coordination function (PIFS)). If the S20 channel is in the idle state, the STA may perform a channel bonding for the P20 channel and the S20 channel That is, the STA may transmit a signal (PPDU) through a 40 MHz channel (i.e., a 40 MHz bonding channel) including the P20 channel and the S20 channel.

Figure 18:
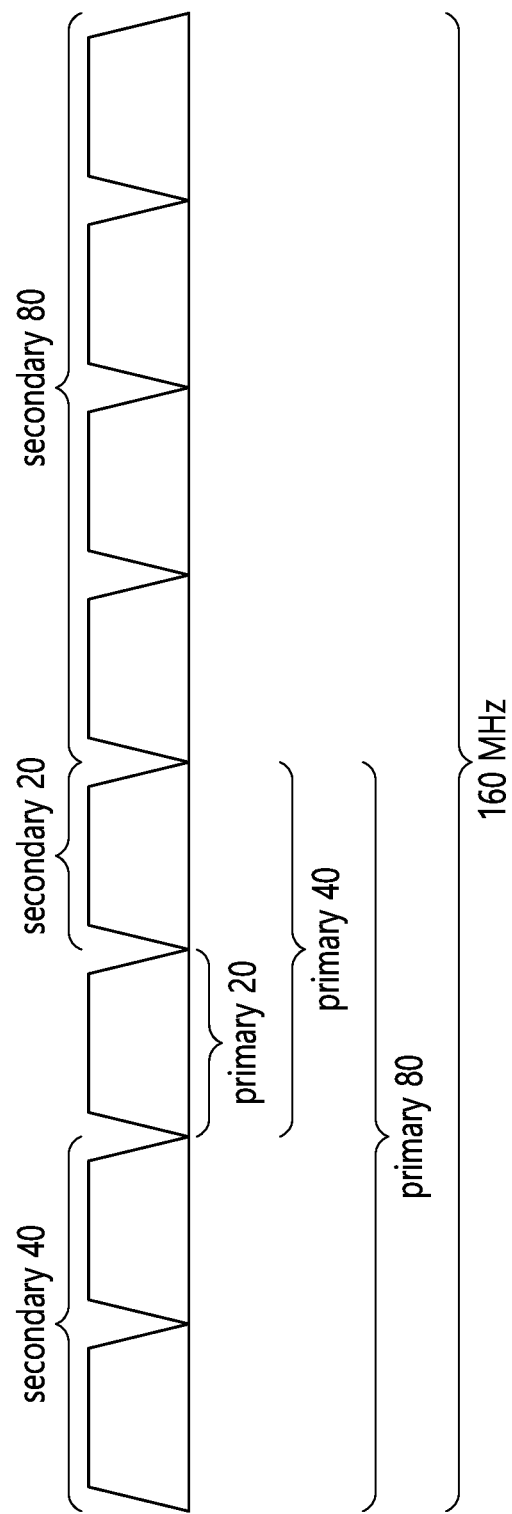
FIG. 18 shows an example of channel bonding.

FIG. 18 shows an example of channel bonding. As shown in FIG. 18, the Primary 20 MHz channel and the Secondary 20 MHz channel may constitute/configure a 40 MHz channel (Primary 40 MHz channel) through the channel bonding. That is, the bonded 40 MHz channel may include a Primary 20 MHz channel and a Secondary 20 MHz channel.

The channel bonding may be performed when a channel contiguous to the primary channel is in an idle state. In other words, while the Primary 20 MHz channel, the Secondary 20 MHz channel, the Secondary 40 MHz channel, and the Secondary 80 MHz channel can be sequentially bonded, the channel bonding may not be performed when the Secondary 20 MHz channel is determined to be in a busy state. In addition, when the secondary 20 MHz channel is in the idle state and the secondary 40 MHz channel is determined to be in the busy state, channel bonding may be performed only for the primary 20 MHz channel and the secondary 20 MHz channel.

Hereinafter, the technical features of the multilink and aggregation will be described.

The STA (e.g., an AP and/or a non-AP STA) of the present specification may support multilink communication. That is, the STA may simultaneously transmit and receive signals through the first link and the second link based on the multi-links. That is, the multilink (or multilink scheme/technique) may mean a technique in which one STA simultaneously transmits and receives signals through a plurality of links. For example, transmitting a signal through one link and receiving a signal through another link may also be included in the above-mentioned multilink communication. An STA supporting multilink may use a plurality of links in a first time period and use only one link in a second time period.

Figure 19:
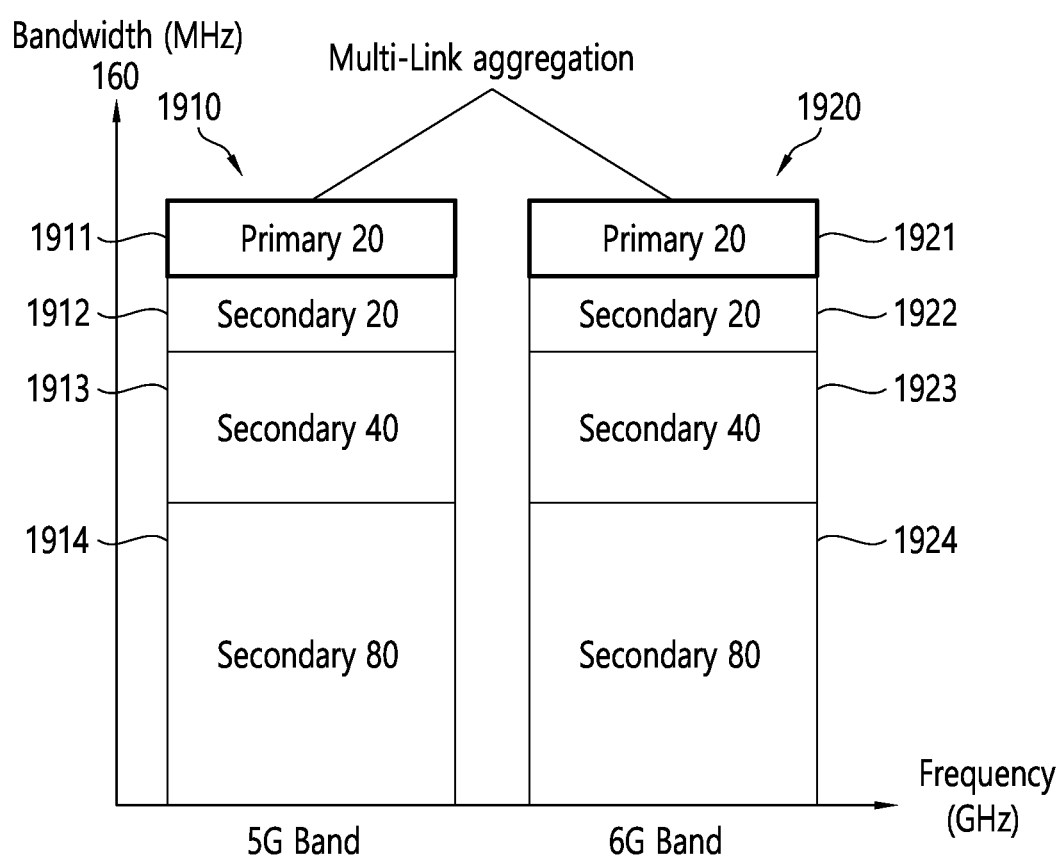
FIG. 19 is a diagram explaining technical features of links applied to the multilink.

FIG. 19 is a diagram explaining technical features of links applied to the multilink.

A link used for multilink may have at least one of the following technical features. Technical features related to links described below are exemplary, and additional technical features may be applied.

For example, each link used for multilink may be included in a different band. That is, when a multilink scheme/technique supporting the first and second links is used, each of the first link and the second link can be included in a 2.4 GHz band, a 5 GHz band, or a 6 GHz band, but the first link and the second link can be included in different bands.

Referring to FIG. 19, a first link 1910 and a second link 1920 may be used for multilink (scheme/technique). The first link 1910 of FIG. 19 may be included in, for example, a 5 GHz band. The second link 1920 of FIG. 19 may be included in, for example, a 6 GHz band.

Each link used for multilink (scheme/technique) may be included in the same band. For example, when the multilink supporting the first/second/third link is used, all links can be included in the same band, or the first/second links can be included in the first band and the third link can be included in the second band.

The multilink (scheme/technique) may be configured based on different RF modules (e.g., IDFT/IFFT blocks). Additionally or alternatively, a plurality of links included in the multilink may be discontinuous in the frequency domain. That is, a frequency gap may exist in a frequency domain corresponding to the first link and a frequency domain corresponding to the second link among the plurality of links.

As shown in FIG. 19, the first link 1910 may include a plurality of channels 1911, 1912, 1913, and 1914. The STA may apply the existing channel bonding to a plurality of channels 1911, 1912, 1913, and 1914. That is, when a plurality of channels 1911, 1912, 1913, 1914 are in an idle state for a specific time period (for example, during PIFS), a plurality of channels 1911, 1912, 1913, 1914 can be used as one bonding channel and said one bonding channel may operate as one link 1910. Alternatively, a part of a plurality of channels 1911, 1912, 1913, 1914 may operate as one link 1910 through the preamble puncturing technique/scheme which was proposed in the IEEE 802.11ax standard. The above-described features can be applied to the second link 1920 in the same manner. The above-described features can be applied equally to the second link 1920.

An upper limit may be set on the number of channels (and/or maximum bandwidth) included in one link used for multilink. For example, as in the example of FIG. 19, up to four channels may constitute/configure one link. Additionally or alternatively, the maximum bandwidth of one link may be 160 MHz, 240 MHz, or 320 MHz. Additionally or alternatively, one link may include contiguous channels only. The specific values above are optional and subject to change.

A procedure for identifying/specifying/determining a link used for multilink is related to an aggregation (or channel aggregation) procedure. The STA may aggregate a plurality of links to perform multilink communication. That is, the STA may perform: 1) a first procedure for identifying/specifying/determining a link aggregated for multilink; and 2) a second procedure for performing multilink communication through the identified/specific/determined link. The STA may perform the first and second procedures as separate procedures, or may simultaneously perform the first and second procedures through one single step/action.

Hereinafter, the technical features of the first procedure will be described.

The STA may transmit/receive information related to a plurality of links configuring a multilink. For example, the AP may use Beacon, Probe Response, Association Response, and/or other control frames to identify information related to a band (and/or a channel) that supports multilink capability. For example, when the AP can perform communication by aggregating some channels in a 5 GHz band and some channels in a 6 GHz band, identification information related to channels (e.g., in 5 GHz and 6 GHz bands) that can be aggregated may be delivered by the AP to the user STA.

For example, the User STA can also transmit information related to a band (and/or a channel) that supports multilink capability through Probe Request, Association Response, and/or other control frames. For example, when the user STA can perform communication by aggregating some channels in a 5 GHz band and some channels in a 6 GHz band, identification information related to channels (e.g., in 5 GHz and 6 GHz bands) that can be aggregated may be delivered by the User STA to the AP.

One of a plurality of links configuring a multilink may operate as a primary link. Primary Link can perform various functions. For example, when the primary link' backoff-value becomes 0 (and/or the primary link has been in the idle state during the recent PIFS), the STA may perform aggregation on another link. Information related to this primary link can also be included in Beacon, Probe Request/Response, and Association Request/Response.

User-STA/AP can specify/determine/acquire a band (and/or channel) on which multilink is performed through a negotiation procedure for exchanging information related to User-STA/AP's capability.

For example, the STA can specify/determine/acquire, through the negotiation procedure, the first candidate band/channel for the first link, the second candidate band/channel for the second link, and the third candidate band/channel for the third link.

Thereafter, the STA may perform a procedure of identifying/specifying/determining a link aggregated for multilink. For example, the STA can aggregate at least two bands/channels based on a backoff-count of (and/or a clear channel assessment (CCA) sensing result (i.e., Busy/Idle)) of a first candidate band/channel, a second candidate band/channel, and a third candidate band/channel. For example, when the backoff count value of the first candidate band/channel becomes 0, the STA may aggregate the second candidate band/channel that has maintained the idle state for a specific period (during the recent PIFS). That is, the STA may determine/specify a first candidate band/channel as a first link for multilink and a second candidate band/channel as a second link for multilink. Accordingly, the STA may perform multilink communication through the first and second links.

Hereinafter, the technical features of the second procedure will be described.

For example, when the STA decides to aggregate the first and second links, the STA may perform multilink communication through the first and second links. For example, the STA may transmit PPDUs of the same length (e.g., same time duration) through both the first and second links. Alternatively, the STA may receive the transmission PPDU through the first link and receive the reception PPDU through the second link during the overlapping time period. The STA performs communication through all aggregated links in a specific time period, and may use only one link in another time period.

Figure 20:
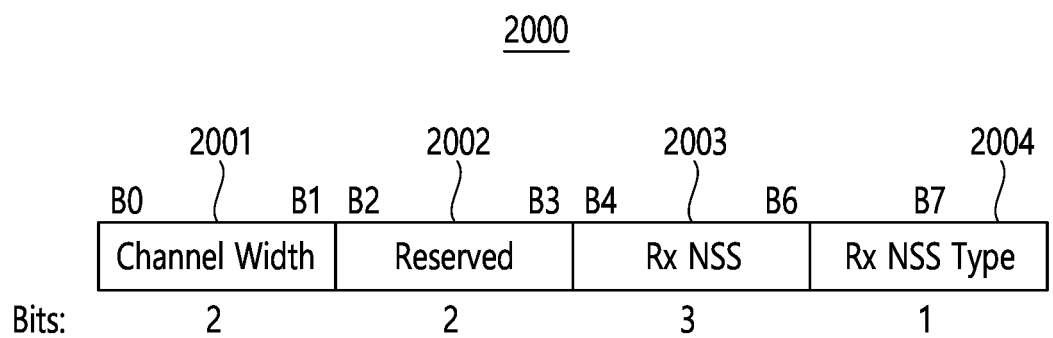
FIG. 20 is an example of control information related to an operating mode in the IEEE 802.11ac standard (i.e., very high throughput (VHT) standard).

Hereinafter, a method of transmitting and receiving control information related to an operating mode (OM) will be described. FIGS. 20 and/or 21 is an example of control information related to the operating mode OM.

FIG. 20 is an example of control information related to an operating mode in the IEEE 802.11ac standard (i.e., very high throughput (VHT) standard).

As shown, the control information includes all or part of a plurality of subfields (e.g., subfields 2001, 2002, 2003, 2004), and may additionally include subfields not shown in FIG. 20. The control information of FIG. 20 may be included in the header of the MAC frame included in the data field of the PPDU.

Referring to FIG. 20, an STA based on the existing IEEE 802.11ac standard may transmit control information related to an operating mode using an operating mode notification frame and/or an operating mode notification element. The operating mode notification frame and/or the operating mode notification element may include a control field 2000 related to an operating mode. The control field 2000 is an example of control information related to an operating mode.

The transmitting STA transmitting the control field 2000 may inform other STAs of a change in the operating channel width and the number of spatial streams of the transmitting STA through the control field 2000.

For example, a Channel Width subfield 2001 of the control field 2000 shown in FIG. 20 may have a size of 2 bits and include operating channel bandwidth information of the transmitting STA (e.g., an AP or a non-AP STA). For example, the Channel Width subfield 2001 may include bandwidth information of an operating channel supported by the transmitting STA. For example, if a value of the Channel Width subfield 2001 is "0," a bandwidth of the operating channel may be 20 MHz; if it is "1," it may be 40 MHz, if it is "2" it may be 80 MHz; and if it is "3," it may be 160 MHz or 80+80 MHz. The bandwidth information of the operating channel included in the Channel Width subfield 2001 may be bandwidth information of a transmission and/or reception channel used by the transmitting STA.

The reception number of spatial streams (Rx NSSs) subfield 2003 may have a size of 3 bits and may include information related to the maximum number of spatial streams that the transmitting STA can receive. That is, the STA receiving the control field 2000 may refer to the Rx NSS subfield 2003 when constructing a PPDU to be transmitted to the STA that has transmitted the control field 2000. The maximum number of spatial streams that the STA can receive may be one of 1 to 8.

STAs receiving the control field 2000 may know information related to the changed (or maintained) operating channel bandwidth and/or spatial stream of the STA that transmitted the control field 2000. In order for the STA to change the operating channel bandwidth or the number of maximum spatial streams, transmission of an operating mode notification frame and/or an operating mode notification element is required. Accordingly, the STA must transmit the operating mode notification frame and/or the operating mode notification element each time the operating channel bandwidth or the number of maximum spatial streams is changed, and thus resources may be used inefficiently. That is, transmission efficiency may decrease due to an increase in overhead.

Figure 21:
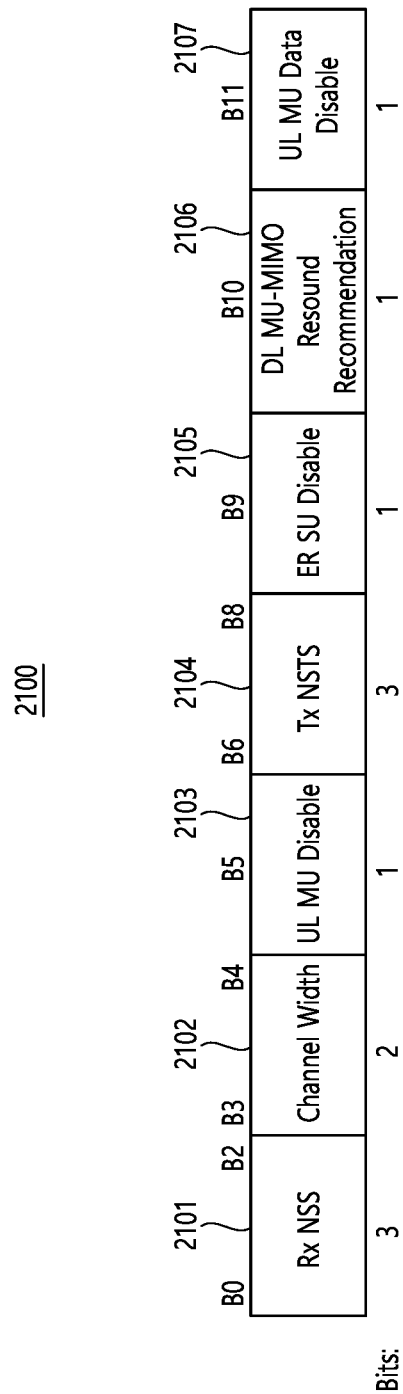
FIG. 21 is an example of control information related to an operating mode in the IEEE 802.11ax standard (i.e., High Efficiency (HE) standard).

FIG. 21 is an example of control information related to an operating mode in the IEEE 802.11ax standard (i.e., High Efficiency (HE) standard).

Control information may be included in the control field 2100 of FIG. 21. The control field 2100 includes all or part of a plurality of subfields (e.g., subfields 2101, 2102, 2103, 2104, 2105, 2106, 2107), and may additionally include subfields not shown in FIG. 21. The control field 2100 of FIG. 21 may be included in the header of the MAC frame included in the data field of the PPDU.

The Rx NSS subfield 2101 of FIG. 21 may include information related to the maximum number of spatial streams used by the transmitting STA (e.g., an AP or a non-AP STA) which has transmitted the control field 210 when the transmitting STA receives a signal/PPDU. The STA may support PPDU reception of a bandwidth of 80 MHz or less. For example, the Rx NSS subfield 2101 may be configured to be an information field having a size of 3 bits.

The value of the Rx NSS subfield 2101 may be set to a value smaller by 1 than the maximum number of spatial streams used when the STA receives a signal/PPDU. For example, when the value of the Rx NSS subfield is 0, the maximum number of spatial streams of the STA receiving a signal/PPDU may set to 1, and when the value of the Rx NSS subfield is 7 the maximum number of spatial streams of the STA receiving a signal/PPDU may set to 8.

For example, the Rx NSS subfield 2101 of FIG. 21 may include information related to the number of spatial streams of the STA receiving a downlink PPDU. That is, when the AP configures the PPDU for a specific receiving STA, the AP may refer to the Rx NSS subfield 2101 for the configuration of the PPDU.

The Channel Width subfield 2102 of FIG. 21 may include bandwidth information of an operating channel supported by a transmitting STA (e.g., an AP or a non-AP STA). For example, if a value of the Channel Width subfield 2102 is "0", a bandwidth of the operating channel may be 20 MHz; if it is "1", it may be 40 MHz; if it is "2" it may be 80 MHz; and if it is "3" it may be 160 MHz or 80+80 MHz. The bandwidth information of the operating channel included in the Channel Width subfield 2102 may be bandwidth information of a transmission and/or reception channel used by the transmitting STA.

The UL MU Disable subfield 2103 of FIG. 21 may indicate whether an STA (e.g., a non-AP STA) reporting control information supports UL MU operation.

The transmission (Tx) number of space-time streams (NSTSs) subfield 2104 of FIG. 21 may include information related to the maximum number of space-time streams used by a transmitting STA (e.g., an AP or a non-AP STA) when the transmitting STA transmits a signal/PPDU. For example, the Tx NSTS subfield 2104 may have a size of 3 bits.

The value of the Tx NSTS subfield 2104 may be set to a value smaller by 1 than the maximum number of space-time streams used by the transmitting STA when the transmitting STA transmits a signal/PPDU. For example, the value of the Tx NSTS subfield 2104 is 0, the maximum number of space-time streams used by the transmitting STA when transmitting a signal/PPDU may be set to 1. Further, when the value of the Tx NSTS subfield 2104 is 7, the maximum number of space-time streams used by the transmitting STA when transmitting a signal/PPDU may be set to 8.

The extended range (ER) single-user (SU) Disable subfield 2105 of FIG. 21 includes information related to whether a transmitting STA (e.g., an AP or a non-AP STA) can receive 242-tone HE ER SU PPDU. For example, if the value of the ER SU Disable subfield 2105 is "0", it may mean that the transmitting STA cannot receive the HE ER SU PPDU. Further, if the value of the ER SU Disable subfield is "1", the transmitting STA may receive the HE ER SU PPDU.

The downlink (DL) multi user-multiple input multiple output (MU-MIMO) Resound Recommendation subfield 2106 of FIG. 21 may be transmitted by a transmitting STA (e.g., an AP or a non-AP STA) to a receiving STA (e.g., an AP or a non-AP STA), and may include information suggesting that the receiving STA should perform channel sounding again or increase the channel sounding frequency. For example, if the value of the DL MU-MIMO Resound Recommendation subfield 2106 is 1, it may mean that the transmitting STA performs channel sounding again to the receiving STA or proposes to increase the channel sounding frequency. If the value of the DL MU-MIMO Resound Recommendation subfield is 0, it may mean that the transmitting STA does not propose channel sounding to the receiving STA.

Figure 22:
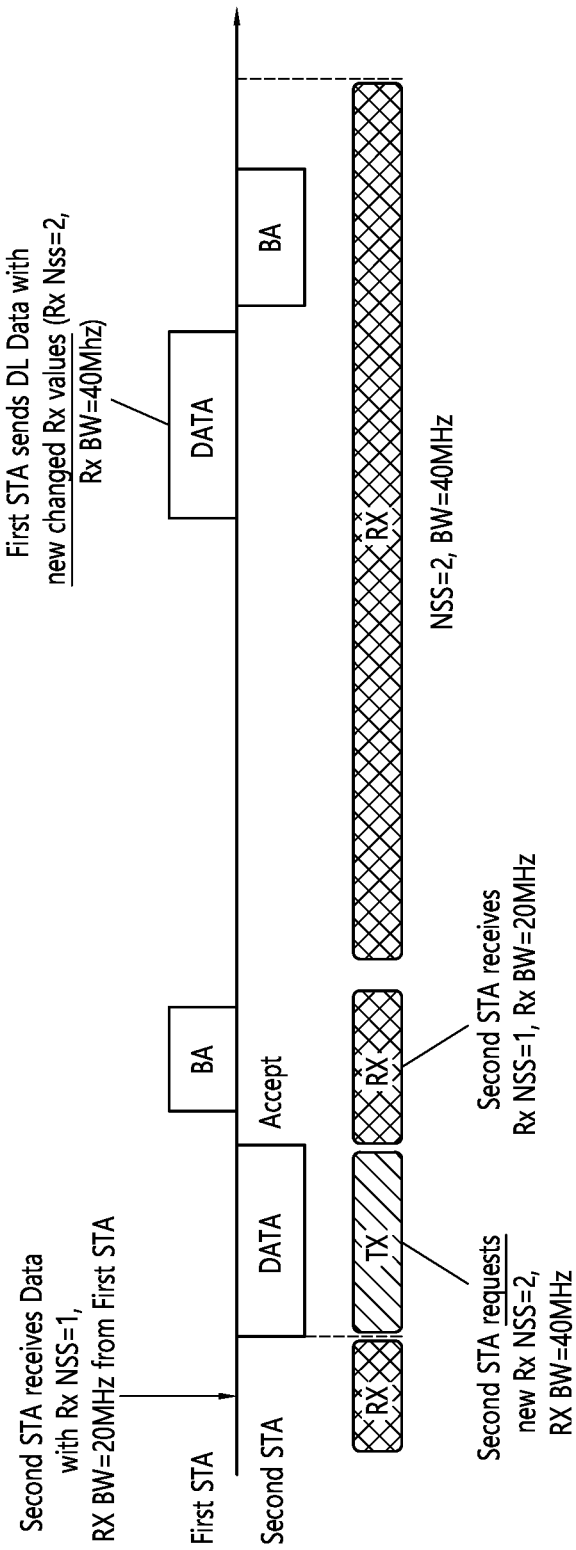
FIG. 22 shows an example in which the reported operating mode control information is used for UL MU operation.

FIG. 22 shows an example in which the reported operating mode control information is used for UL MU operation.

An example of FIG. 22 is an operation between first and second STAs, and a first STA and a second STA may be an AP or a non-AP STA, respectively. In the example of FIG. 22, the second STA is an STA that reports operating mode control information to the first STA.

The first STA may transmit data to the second STA based on control information related to the previously set operating mode of the second STA. For example, the first STA may transmit data to the second STA based on one spatial stream with a 20 MHz bandwidth.

When the second STA changes the operating mode (e.g., in case the maximum number of RX spatial streams is changed to 2 and the operating bandwidth is changed to 40 MHz), the second STA may transmit a PPDU including a data field to the first STA. The data field may include a control field (e.g., the control field 2100) of FIG. 21. The control field transmitted by the second STA may include parameters related to an operating mode, such as the number of spatial streams and/or a channel bandwidth. The second STA may adjust an active receive chain and a channel bandwidth to save its power. For example, the second STA may perform link adaptation by changing the number of spatial streams and operating bandwidth. The first STA may receive the data field from the second STA and may transmit, to the second STA, a block acknowledgment (BA) indicating that the data field has been successfully received.

The first STA may allocate, based on the control information received from the second STA, the UL MU resource to the second STA through a trigger frame. The first STA may transmit data based on the control information received from the second STA. For example, the first STA may transmit data to the second STA based on two spatial streams with a 40 MHz bandwidth. The second STA may transmit, to the first STA, a BA indicating that the corresponding data has been successfully received.

An example of the present specification described below is a technical feature in which an STA (e.g., an AP or a non-AP STA) supporting multilink communication (or multiband communication) transmits/receives information related to an operating mode (OM). For example, when the first STA transmits information related to the operating mode (OM) to the second STA, the information related to the operating mode (OM) includes information on at least one operating band of the first STA. For example, at least one operating band may include a 2.4 GHz band, a 5 GHz band, and/or a 6 GHz band described in FIGS. 1 to 3, and the like. For example, when the first STA transmits information related to the operating mode to the second STA, the information related to the operating mode may include information on an operating parameter applied to at least one operating band of the first STA. For example, the information on the operating parameter applied to the operating band may include information on which operating band to change the operating mode. For example, the operating mode may mean the number of RX spatial streams, channel bandwidth, and the number of TX space-time streams described in FIGS. 20 to 21, and the like. For example, the first STA and the second STA may perform communication based on information related to the operating mode.

An example of the present specification may be related to an operation of transmitting and receiving control information related to a multilink, and of controlling a multilink based on the control information. For example, the operation of controlling the multilink may be an "on/off operation." For example, in the on/off operation, a specific STA (e.g., a User-STA) turns "on" or "off" at least one of the multi-links (e.g., at least one of the first and second links). For example, performing an "on operation" for a specific link may be referred to as activating (or enabling) the corresponding link. For example, performing an "off operation" for a specific link may be referred to as deactivating (or disabling) the corresponding link.

For example, when a first STA transmits control information related to multilink through a first frame and thereafter receives a second frame including ACK information for the first frame, the first STA may turn on or off at least one link (e.g., at least one of the first and second links) based on the control information. The ACK information may be received through an ACK frame, a block ACK frame, a hybrid ARQ (HARQ) frame, or the like.

In the following example, control information related to multilink may be configured through various fields. For example, the control information related to multilink may be a field related to an operating mode (OM). For example, in the present specification, the field related to the OM may include all or part of the fields in FIGS. 20 and/or 21. For example, in the present specification, the field related to the OM may include all or part of the fields in FIG. 24 to be described below.

In other words, the control field related to the OM includes information related to on/off of at least one of the first and second links configuring the multilink (i.e., a plurality of links configuring the multilink). For example, the first and second links are channels of various bandwidths (e.g., 20, 40, 80, 160, 240, 320 MHz) defined within the 2.4 GHz, 5 GHz, and 6 GHz depicted in FIGS. 1 to 3. For example, the first and second links may be defined within the same band (e.g., a 2.4 GHz, 5 GHz, 6 GHz band). For example, the first and second links may be defined in different bands.

For example, the control field related to the OM described below may include bitmap information for at least one of the first and second links (i.e., a plurality of links configuring a multilink). The bitmap information may have a length of N bits (N is an arbitrary positive number). For example, for individual bits of the N bits, a corresponding link may be determined in advance. For example, when an individual bit of the N bits has a first value (e.g., 0 or 1), such bit may indicate an on operation is performed for a corresponding link. For example, when an individual bit of the N bits has a second value (e.g., 0 or 1), such bit may indicate an off operation is performed for a corresponding link.

For example, the control field related to the OM described below may include index information for at least one of the first and second links (i.e., a plurality of links configuring a multilink). For example, the index information includes identification information related to a band in which the link is included (e.g., a 2.4 GHz, 5 GHz, 6 GHz band) and a bandwidth of the link (e.g., 20, 40, 80, 160, 240, 320 MHz channels).

For example, the control field related to the OM described below includes information related to a bandwidth of at least one of the first and second links (i.e., a plurality of links configuring a multilink), and the maximum value of the bandwidth may set to 320 MHz.

For example, the control field related to the OM described below includes information related to the number of RX streams applied to at least one of the first and second links (i.e., a plurality of links configuring a multilink), and the maximum number of the RX streams may set to 16.

For example, the control field related to the OM described below includes information related to the number of TX streams applied to at least one of the first and second links (i.e., a plurality of links configuring a multilink), and the maximum value of the number of TX streams may set to 16. The maximum value of the number of TX/RX streams may set to various values (e.g., 8, 4, etc.).

An example of the control field related to the above-described OM may be variously changed. For example, it is not necessary to include all of the above-described various information fields (i.e., fields related to the bitmap, index, bandwidth, and stream), but only a part of the information fields may be used.

For example, the example of FIG. 23 described below may include on/off information about a specific band (e.g., a 2.4 GHz, 5 GHz, 6 GHz band) in the control field related to the OM. However, it is evident that the example of FIG. 23 may be variously changed based on the above description. For example, as described above, information related to on-off for at least one of the first and second links configuring the multilink (i.e., a plurality of links configuring the multilink) may be included in the control field related to the OM. Further, as described above, the first and second links may be included in the same band.

Figure 23:
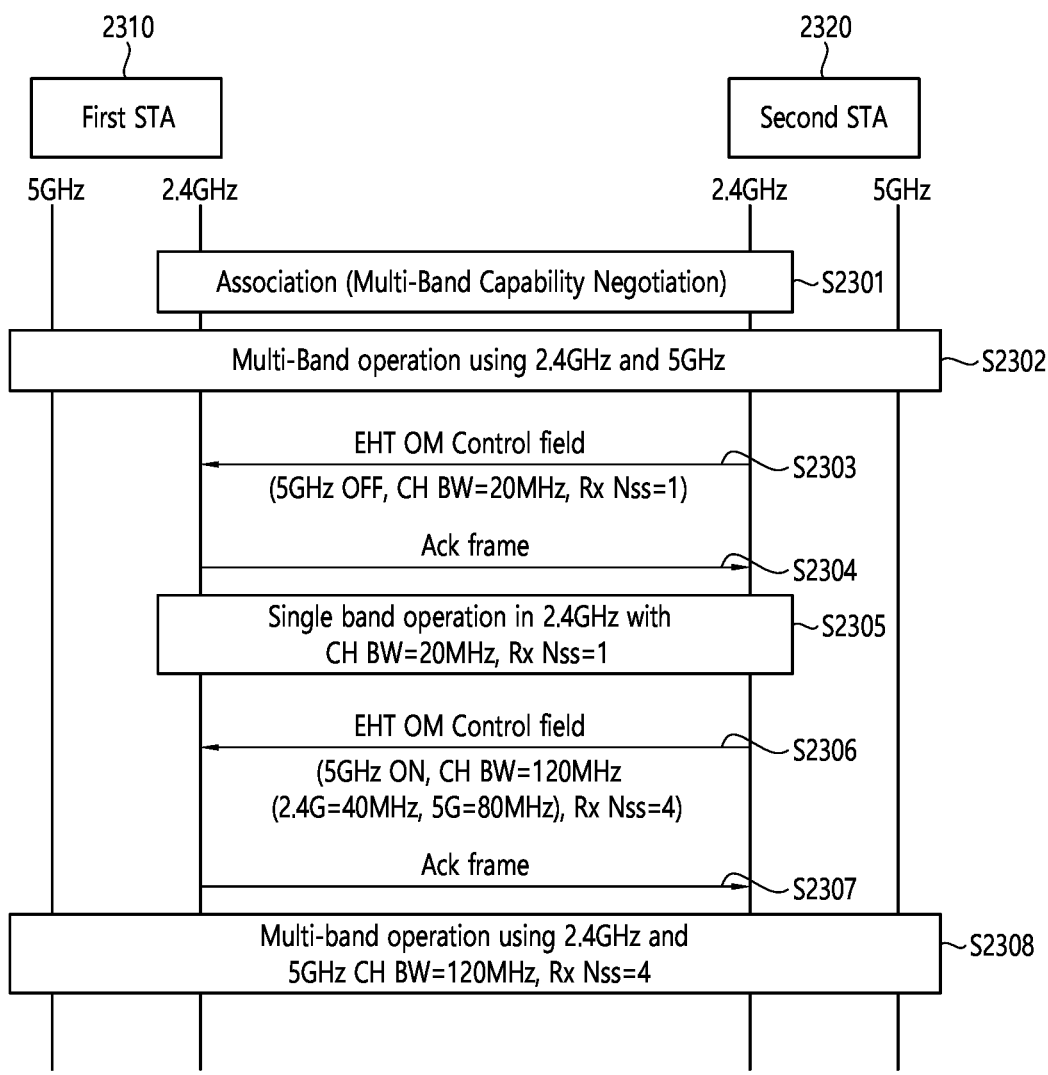
FIG. 23 is a flowchart illustrating an embodiment of a method of transmitting control information.

FIG. 23 is a flowchart illustrating an embodiment of a method of transmitting control information.

FIG. 23 is an example of a method in which an STA (e.g., an AP or a non-AP STA) supporting multilink (or multiband communication) transmits/receives information related to the operating mode (OM). The first STA 2310 and the second STA 2320 may be an AP or a non-AP STA, respectively. The first STA 2310 and the second STA 2320 may support multiband (or multilink communication). To save power and improve performance, the operating mode parameters (e.g., channel bandwidth, number of RX spatial streams, number of TX space-time streams, etc.) may be controlled per operating band (e.g., a 2.4 GHz, 5 GHz, 6 GHz band). The multiband/multilink operation may be performed as described in FIG. 19.

The first STA 2310 may perform an association procedure with the second STA 2320 (S2301). The association procedure may include a multi-band capability negotiation procedure. For example, the first STA 2310 and the second STA can exchange information whether the counterpart STA supports the multilink. Further, the first STA 2310 and the second STA can exchange information related to which operating band (e.g., a 2.4 GHz band, a 5 GHz band, or a 6 GHz band) is supported is supported for the multilink in the counterpart STA. The first STA 2310 and the second STA 2320 may select, through the negotiation procedure, whether to perform a multi-band operation and an operating band in which the multi-band operation is to be performed. For example, the first STA 2310 and the second STA 2320 may determine to perform the multiband operation using a 2.4 GHz band and a 5 GHz band.

The second STA 2320 may be associated with the first STA 2310. After the first STA 2310 and the second STA 2320 are associated, they may perform a multi-band operation (S2302). For example, the first STA 2310 and the second STA 2320 may transmit and receive signals through a plurality of operating bands (e.g., a 2.4 GHz band and a 5 GHz band) using at least one RF unit.

The second STA 2320 may transmit control information related to the operating mode to the first STA 2310 (S2303). The control information may include a control field related to the operating mode (e.g., an OM control field). An example of the control field related to the operating mode will be described as follows.

Figure 24:
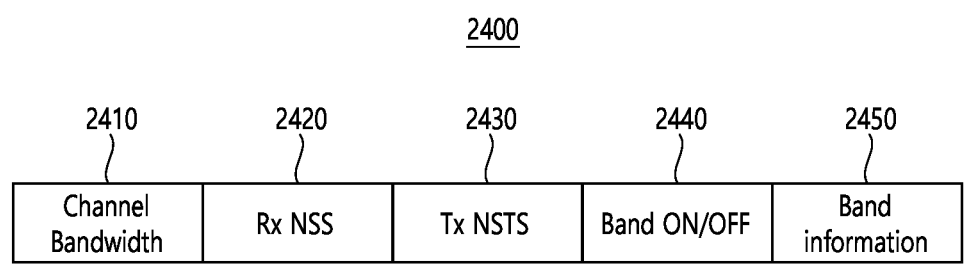
FIG. 24 is a diagram showing an embodiment of a control field related to an operating mode.

FIG. 24 is a diagram showing an embodiment of a control field related to an operating mode.

FIG. 24 is an example of the control field related to the operating mode (OM), and a specific field of FIG. 24 may be variously changed. For example, the above-described various information (e.g., bitmap, index, bandwidth, number of TX/RX streams) for at least one of the first and second links configuring a multilink (i.e., a plurality of links configuring the multilink) Information related to) may be further included in FIG. 24.

Referring to FIG. 24, the control field 2400 includes all or part of a plurality of subfields 2410, 2420, 2430, 2440, and 2450, and may additionally include subfields not shown in FIG. 24. The control field 2400 may be included in the header of the MAC frame included in the data field of the The Channel Bandwidth subfield 2410 may include bandwidth information of an operating channel supported by a transmitting STA (e.g., the second STA 2320) transmitting the control information. For example, the Channel Bandwidth subfield 2410 may include information related to 20 MHz, 40 MHz, 80 MHz, 160 MHz, 80+80 MHz, 320 MHz, or 160+160 MHz. Alternatively, the Channel Bandwidth subfield 2410 may include information related to 120 MHz or 240 MHz. The above-mentioned 120 MHz may mean 40+80 MHz, and the 240 MHz may mean 80+160 MHz. For example, when the Channel Bandwidth subfield 2410 includes information related to the 120 MHz, the transmitting STA may support a 40 MHz channel and an 80 MHz channel within the same operating band, or a 40 MHz channel and an 80 MHz channel in different operating bands. The bandwidth information of the operating channel included in the Channel Bandwidth subfield 2410 may be bandwidth information of a transmission and/or reception channel used by the transmitting STA.

The Rx NSS subfield 2420 of FIG. 24 may include information related to the maximum number of spatial streams (hereinafter, referred to as Rx NSS parameter) used when a signal/PPDU is received by a TX STA transmitting the control information. For example, the Rx NSS subfield 2420 may include information related to how many RX spatial streams the transmitting STA uses when receiving a signal/PPDU among 1, 2, 4, 8, or 16. Alternatively, the Rx NSS subfield 2420 may include information related to how many RX spatial streams the transmitting STA uses when receiving a signal/PPDU from among 3, 5, 6, 9, 10, or 12. In the above example, 3 RX spatial streams may imply '1+2' spatial streams, 5 RX spatial streams may imply '1+4' spatial streams, 6 RX spatial streams may imply '2+4' spatial streams, 9 RX spatial streams may imply '1+8' spatial streams, 10 RX spatial streams may imply '2+8' spatial streams. In addition, 12 RX spatial streams may imply '4+8' spatial streams. In detail, when the Rx NSS subfield 2420 includes information related to the 3 RX spatial streams (which may imply '1+2' streams), the TX STA may receive a signal/PPDU in the first channel included in the first operating band (e.g., a 2.4 GHz band) and its maximum number of RX spatial stream is set to one by the TX STA. Also, the same TX STA may receive a signal/PPDU in the second channel included in the second operating band (e.g., a 5 GHz band), and its maximum number of RX spatial streams is set to two. Alternatively, when the Rx NSS subfield indicates three spatial streams, the TX STA may use at most one RX spatial stream in the first channel and at most two RX spatial streams in the second channel which belongs to the same operating band of the first channel.

For example, the Rx NSS subfield 2420 may indicate the number of spatial streams used by the TX STA when receiving a PPDU. The STA (e.g., the first STA) that has received the control information may refer to the corresponding subfield when configuring the PPDU for the transmitting STA (e.g., the second STA) that has transmitted the control information.

The Tx NSTS subfield 2430 of FIG. 24 includes information related to the maximum number of space-time streams (hereinafter, referred to as a Tx NSTS parameter) used when a signal/PPDU is transmitted by a TX STA transmitting the control information. For example, the Tx NSTS subfield 2430 may include information related to how many TX space-time streams of 1, 2, 4, 8, or 16 the TX STA uses when transmitting a signal/PPDU among 1, 2, 4, 8, or 16. Alternatively, the Tx NSTS subfield 2430 may include information related to how many TX space-time streams the TX STA uses when transmitting a signal/PPDU among 3, 5, 6, 9, 10, or 12. In the above example, 3 TX spatial streams may imply '1+2' spatial streams, 5 TX spatial streams may imply '1+4' spatial streams, 6 TX spatial streams may imply '2+4' spatial streams, 9 TX spatial streams may imply '1+8' spatial streams, 10 TX spatial streams may imply '2+8' spatial streams. In addition, 12 TX spatial streams may imply '4+8' spatial streams. In detail, when the Tx NSTS subfield 2430 includes information related to the 5 space-time streams (which may imply '1+4' streams), the TX STA may transmit a signal/PPDU in the first channel included in the first operating band (e.g., a 2.4 GHz band) and its maximum number of TX space-time streams is set to one by the TX STA. Also, the same TX STA may transmit a signal/PPDU in the second channel included in the second operating band (e.g., a 5 GHz band), and its maximum number of TX space-time streams is set to four. Alternatively, when the Tx NSTS subfield 2430 includes information on five spatial-time streams, the TX STA may use at most one TX spatial stream in the first channel and at most four TX spatial streams in the second channel which belongs to the same operating band of the first channel.

The Band ON/OFF subfield 2440 in FIG. 24 may include information related to an operating band supported by the TX STA transmitting the control information. There may be at least one operating band supported by the TX STA. For example, the Band ON/OFF subfield 2440 may include information related to whether the operating band of the TX STA includes a 2.4 GHz band, whether the operating band of the TX STA includes a 5 GHz band, and whether the operating band of the TX STA includes a 6 GHz band.

For example, the Band ON/OFF subfield 2440 may include first to third information bits. Each of the first to third information bits may have a length of 1 bit. The first information bit may include information related to whether the operating band of the transmitting STA includes a 2.4 GHz band. When the first information bit value is 0, it may mean that the operating band of the transmitting STA does not include the 2.4 GHz band, and when the first information bit value is 1, the operating band of the TX STA includes the 2.4 GHz band. The second information bit may include information related to whether the operating band of the TX STA includes a 5 GHz band. When the second information bit value is 0, it may mean that the operating band of the transmitting STA does not include the 5 GHz band, and when the second information bit value is 1, the operating band of the TX STA includes the 5 GHz band. The third information bit may include information related to whether the operating band of the TX STA includes a 6 GHz band. When the third information bit value is 0, it may mean that the operating band of the transmitting STA does not include the 6 GHz band, and when the third information bit value is 1, the operating band of the TX STA includes the 6 GHz band.

The 6 GHz band can be classified into a plurality of frequency bands. For example, the 6 GHz band may be classified into 6 GHz band #1 and 6 GHz band #2. The 6 GHz band #1 may be a part of the frequency band included in the 6 GHz band, and the 6 GHz band #2 may be included in the 6 GHz band and may be the remaining frequency band other than the 6 GHz band #1. In this case, for example, the Band ON/OFF subfield may include first to fourth information bits. Each of the first to fourth information bits may have a length of 1 bit. The first information bit may include information related to whether the operating band of the TX STA includes a 2.4 GHz band, and the second information bit includes information on whether the operating band of the TX STA includes a 5 GHz band. The third information bit may include information related to whether the operating band of the TX STA includes the 6 GHz band #1. When the third information bit value is 0, it may mean that the operating band of the TX STA does not include the 6 GHz band #1, and when the third information bit value is 1, the operating band of the TX STA includes the 6 GHz band #1. The fourth information bit may include information related to whether the operating band of TX STA includes the 6 GHz band #2. When the fourth information bit value is 0, it may mean that the operating band of the TX STA does not include the 6 GHz band #2, and when the fourth information bit value is 1, the operating band of the TX STA includes the 6 GHz band #2.

Information related to an operating band included in the Band ON/OFF subfield 2440 may be used for a communication performed after an association established between STAs. That is, during an association procedure, multi-band operation between STAs may not be allowed.

According to another embodiment, whether the operating band of the TX STA includes a frequency band (e.g., a 2.4 GHz band, a 5 GHz band, a 6 GHz band, etc.) may be determined based on the Band information subfield 2450 and the Channel Bandwidth subfield 2410 in FIG. 24 without referring to the Band ON/OFF subfield 2440.

The Band information subfield 2450 of FIG. 24 includes information on which operating band the values of the Channel Bandwidth subfield 2410, the Rx NSS subfield 2420, and the Tx NSTS subfield 2430 in the control field 2440 are applied to.

For example, the second STA 2320 transmits, to the first STA 2310, a signal including the control field (2400) comprising: the Band information subfield 2430 having information on a 2.4 GHz band; the Channel Bandwidth subfield 2410 having information on an 80 MHz channel bandwidth; Rx NSS subfield 2420 having information that the Rx NSS parameter is set to 8; and Tx NSS subfield 2430 having information that the Tx NSS parameter is set to 16. The first STA 2310 may receive a signal including the control field 2400. The first STA 2310 may use a channel of 80 MHz bandwidth in communication with the second STA 2320 through the 2.4 GHz band. Further, the first STA 2310 may figure out that the maximum number of RX spatial streams used by the second STA 2320 of is set to 8 and that the maximum number of TX spatial streams used by the second For example, the Band information subfield 2450 of the control field 2400 transmitted by the second STA 2320 may include information related to the 2.4 GHz band, and the Channel Bandwidth subfield 2410 and/or the Rx NSS subfield may indicate 0. In this case, the 2.4 GHz band may not be included in the operating band of the second STA 2430. Also, the Band ON/OFF subfield 2440 may not be defined in the above case.

The band information subfield 2450 may indicate or includes information related to a plurality of operating bands. For example, the Band information subfield 2450 may indicate a 2.4 GHz band and a 5 GHz band. When the band information subfield 2450 indicates two or more operating bands, other operating parameters (e.g., operating channel bandwidth, Rx NSS parameter, Tx NSTS parameter, etc.) are: 1) commonly applied to the two or more operating bands (hereinafter, referred to as "case #1"); or 2) separately applied to the two or more operating bands (hereinafter, referred to as "case #2").

In case #1, if the band information subfield 2450 includes information related to the 2.4 GHz band and the 5 GHz band, operating parameters may be commonly applied to the 2.4 GHz band and the 5 GHz band. For example, the Band information subfield 2450 may include information related to the 2.4 GHz band and the 5 GHz band, the Channel Bandwidth subfield 2410 may include information on the channel bandwidth of 120 MHz, and the Rx NSS subfield 2420 may include an operating parameter of '4'. In this case, the STA (e.g., the second STA) that transmitted the control field 2400 may use a 40 MHz channel in the 2.4 GHz band, an 80 MHz channel in the 5 GHz band, and up to four RX spatial streams for receiving signals in the 2.4 GHz and 5 GHz bands.

Alternatively, for example, the Band information subfield 2450 may include information related to the 2.4 GHz band and the 5 GHz band, the Channel Bandwidth subfield 2410 may include information related to the 80 MHz channel bandwidth, and the Rx NSS subfield may include information that the Rx NSS parameter value is set to 4. In this case, the STA (e.g., the second STA) that has transmitted the control field 2400 may use an 80 MHz channel bandwidth in the 2.4 GHz and 5 GHz bands, and up to four RX spatial streams for receiving signals.

In case #2, the band information subfield 2450 may include information related to the 2.4 GHz band and the 5 GHz band, and the operating parameters may include one value applied to the 2.4 GHz band and another value applied to the 5 GHz band. For example, when the Band information subfield 2450 indicates a 2.4 GHz band and a 5 GHz band, the Channel Bandwidth subfield 2410 includes one channel bandwidth used in the 2.4 GHz band (e.g., 40 MHz) and also includes another bandwidth used in the 5 GHz band (e.g., 160 MHz).

Alternatively, features of case #1 and case #2 can be mixed, and thus a common parameter and a per-band parameter (or a band specific parameter) may be separately defined in the same control field. For example, the Rx NSS parameter may be defined as a common parameter and the Tx NSTS parameter may be defined as a per-band parameter. When the Band information subfield 2450 of the TX STA transmitting the control field 2400 indicates the 2.4 GHz band and the 5 GHz band, the Rx NSS subfield 2420 includes one common value (e.g., 8) applied to both the 2.4 GHz band and the 5 GHz band. Further, the Channel Bandwidth subfield 2410 includes one Rx NSS parameter value (e.g., 20 MHz) applied to the 2.4 GHz band and another Rx NSS parameter value (e.g., 80 MHz) applied to the 5 GHz band.

Referring back to FIG. 23, the first STA 2310 may receive the control information related to the operating mode (OM) from the second STA 2320. The control information may include the control field 2400 of FIG. 24. The control field 2400 may include a Channel Bandwidth subfield 2410, Rx NSS subfield 2420, Tx NSTS subfield 2430, Band ON/OFF subfield 2440, and Band information subfield 2450, as shown in FIG. 24. The Channel Bandwidth subfield 2410 in the control field 2400 may include information related to the 20 MHz bandwidth, the Rx NSS subfield 2420 contains information related to that the Rx NSS parameter is set to 1, and the Band ON/OFF subfield (2440) includes information related to that the operating band of the second STA 2320 includes a 2.4 GHz band and does not include a 5 GHz band (e.g., the first information bit value of the Band ON/OFF subfield 2440 can be set to 1 and the second information bit value thereof can be set to 0).

The first STA 2310 may exclude the 5 GHz band from the operating band based on the received control field 2400. That is, the first STA 2310 may communicate with the second STA 2320 only through the 2.4 GHz band. The first STA 2310 may set a bandwidth of the operating channel to 20 MHz based on the received control field 2400. Since the first STA 2310 has an operating band of 2.4 GHz, it may communicate with the second STA 2320 through a 20 MHz channel in the 2.4 GHz band. The first STA 2310 may be informed that the Rx NSS parameter of the second STA 2320 is set to 1 based on the received control field 2400. That is, the first STA 2310 may figure out that the maximum number of RX spatial streams used by the second STA 2320 is set to one.

When the first STA 2310 successfully receives the control field 2400 from the second STA 2320, the first STA 2310 may transmit a response frame (e.g., an ACK frame) to the second STA 2320 (S2304). The second STA 2320 may receive a response frame from the first STA 2310.

The first STA 2310 and the second STA 2320 may perform communication based on the control field 2400 transmitted from the second STA 2320 (S2305). In other words, at least one of the first STA 2310 and the second STA 2320 may perform an on/off operation based on the control field 2400. That is, the first STA 2310 and the second STA 2320 may use a channel having a 20 MHz bandwidth in one frequency band (i.e., a 2.4 GHz band). The second STA 2320 may turn off the power of an RF unit (e.g., a transceiver) used for signal transmission and reception in a 5 GHz band. When receiving a signal, the second STA 2320 may use at most one RX spatial stream. Further, the first STA 2310 may transmit, based on the Rx NSS parameter of the second STA 2320 being set to 1, a signal to the second STA 2320

Thereafter, the second STA 2320 may transmit the control field 2400 to the first STA 2310 to change the operating mode again (S2306). The Channel Bandwidth subfield 2410 of the control field 2400 may include information related to the 120 MHz bandwidth. Further, the Rx NSS subfield 2420 may include information related to the Rx NSS parameter being set to 4. Further, the Band ON/OFF subfield 2440 may include information related to that the operating band of the second STA 2320 includes a 2.4 GHz band and a 5 GHz band (e.g., the first information bit value of the Band ON/OFF subfield 2440 may set to 1, and the second information bit value thereof may set to 1). The first STA 2310 may receive the control field 2400 from the second STA 2320.

The first STA 2310 may include a 2.4 GHz band and a 5 GHz band in the operating band based on the received control field 2400. That is, the first STA 2310 may communicate with the second STA 2320 through a 2.4 GHz band and a 5 GHz band. The first STA 2310 may set a bandwidth of the operating channel to 120 MHz based on the received control field 2400. The first STA 2310 may communicate with the second STA 2320 through a channel of 40 MHz bandwidth in the 2.4 GHz band, and communicate with the second STA 2320 through an 80 MHz channel in the 5 GHz band. The first STA 2310 may figure out that the Rx NSS parameter of the second STA 2320 is set to 4 based on the received operating mode control information. That is, it can be seen that the maximum number of RX spatial streams used by the second STA 2320 is set to four.

When the first STA 2310 successfully receives the control information from the second STA 2320, the first STA 2310 may transmit a response frame to the second STA 2320 (S2307). The second STA 2320 may receive a response frame from the first STA 2310.

The first STA 2310 and the second STA 2320 may perform communication based on the control information transmitted by the second STA 2320 (S2308). In other words, at least one of the first STA 2310 and the second STA 2320 may perform an on/off operation based on the control field 2400. That is, the first STA 2310 and the second STA 2320 may use a channel having a bandwidth of 40 MHz in a 2.4 GHz band and a channel having a bandwidth of 80 MHz in a 5 GHz band. The second STA 2320 may turn on the power of an RF unit (e.g., a transceiver) used for signal transmission and reception in a 5 GHz band. The second STA 2320 may use up to 4 spatial streams when receiving a signal. Further, the first STA 2310 may transmit a signal to the second STA 2320 based on the second STA's Rx NSS parameter being set to 4.

Figure 25:
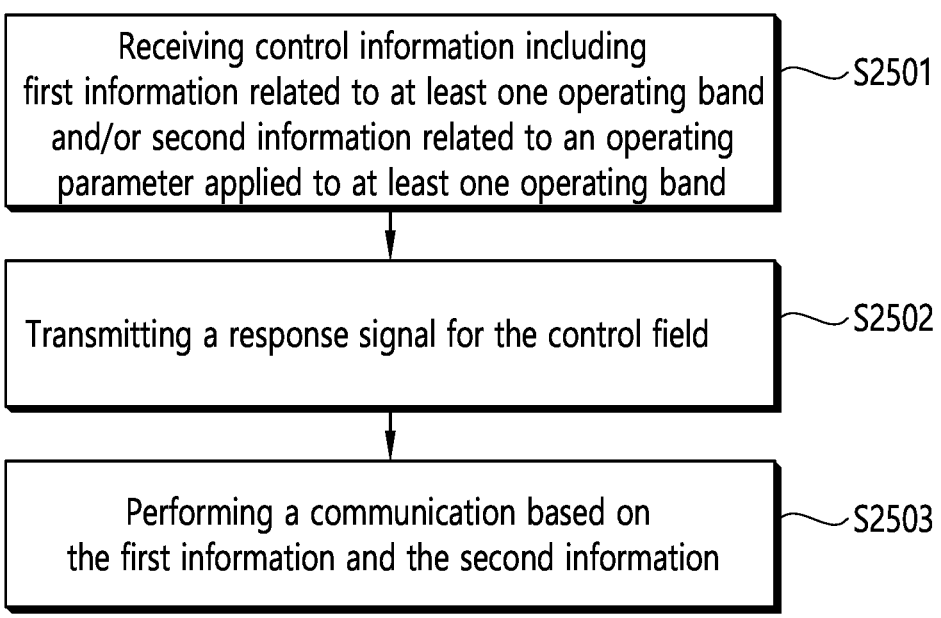
FIG. 25 is a flowchart illustrating an embodiment of an operation of a first STA (e.g., an AP or a non-AP STA) according to FIG. 23.

FIG. 25 is a flowchart illustrating an embodiment of an operation of a first STA (e.g., an AP or a non-AP STA) according to FIG. 23.

Referring to FIG. 25, a first STA and a second STA (e.g., an AP or a non-AP STA) may be an example of the first STA and the second STA of FIG. 23, respectively. The first STA may receive control information related to an operating mode from the second STA (S2501). The control information may include a control field related to an operating mode (e.g., an OM control field). An example of the control field may be as shown in FIG. 24. For example, the control field may include first information related to at least one operating band and/or second information related to an operating parameter applied to at least one operating band.

When the first STA successfully receives the control field from the second STA, the first STA may transmit a response signal for the control field to the second STA (S2502). Thereafter, the first STA may communicate with the second STA based on the first information (e.g., information included in the Band ON/OFF subfield) and the second information (e.g., information included in the Band information subfield) in the control field (S2503).

FIG. 26 is a flowchart illustrating an embodiment of an operation of a second STA (e.g., an AP or a non-AP STA) according to FIG. 23.

Referring to FIG. 26, a second STA and a first STA (e.g., an AP or a non-AP STA) may be an example of the first STA and the second STA of FIG. 23, respectively. The second STA may transmit control information related to an operating mode to the first STA (S2601). The control information may include a control field related to an operating mode (e.g., an OM control field). An example of the control field may be as shown in FIG. 24. For example, the control field may include first information related to at least one operating band and/or second information related to an operating parameter applied to at least one operating band.

When the control field is successfully transmitted to the first STA, the second STA may receive a response signal for the control field from the first STA (S2602). Thereafter, the second STA may communicate with the first STA based on the first information (e.g., information included in the Band ON/OFF subfield) and the second information (e.g., information included in the Band information subfield) in the control field (S2603).

Figure 27:
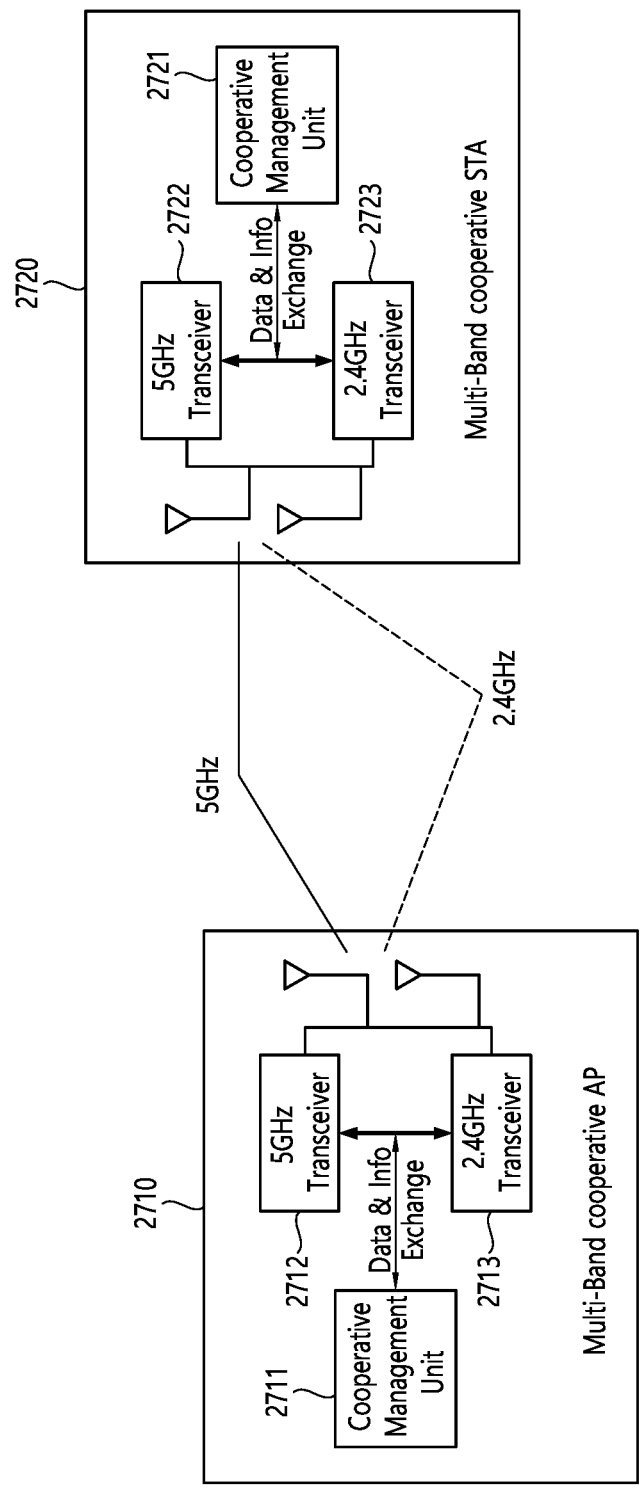
FIG. 27 is a block diagram showing an example of a wireless device to which the present embodiment can be applied.

FIG. 27 is a block diagram showing an example of a wireless device to which the present embodiment can be applied.

Referring to FIG. 27, the wireless device may be an STA (e.g., a non-AP STA and/or an AP) capable of implementing the above-described embodiments/examples. The STAs 2710 and 2720 include a processor (e.g., a cooperative management unit 2711 and 2721), a memory (not shown), and a radio frequency unit (RF).

The RF unit is connected to the processors 2711 and 2721 and transmits/receives radio signals.

The RF unit is connected to the processors 2711 and 2721 and transmits/receives radio signals. The RF unit may include at least one transceiver 2712, 2713, 2722, and 2723. The transceivers 2712, 2713, 2722, and 2723 may support signal transmission through different operating bands (e.g., a 5 GHz band, a 2.4 GHz band, or a 6 GHz band). Each of the transceivers supporting different operating bands may independently perform channel clear assessment (CCA). Signals of the transmission/reception units 2712, 2713, 2722, and 2723 supporting different operating bands may be combined and transmitted, or may be transmitted independently.

The STAs 2710 and 2720 may support a maximum of 16 spatial streams. The STAs 2710 and 2720 may support multilink (or multiband communication). The multilink operation may be the same as or similar to the technical features described in FIG. 19. The STAs 2710 and 2720 supporting multilink may simultaneously perform transmission/reception through different frequencies. Here, different frequencies may mean different operating bands (e.g., a 2.4 GHz band and a 5 GHz band), or different channels (e.g., a first channel and a second channel within the same 2.4 GHz band). The STAs 2710 and 2720 may support an independent multilink operation, and may support a full-duplex operation using a frequency division duplex (FDD) scheme.

Figure 28:
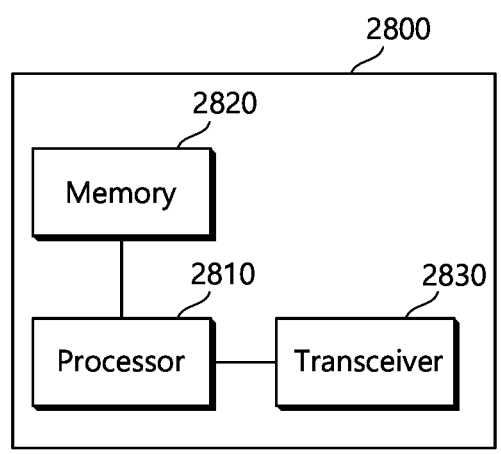
FIG. 28 shows a transmitting STA or a receiving STA to which an example of the present specification is applied.

FIG. 28 shows a transmitting STA or a receiving STA to which an example of the present specification is applied.

Referring to FIG. 28, the STA 2800 may include a processor 2810, a memory 2820, and a transceiver 2830. The feature of FIG. 28 may be applied to a non-AP STA or an AP STA. The illustrated processor, memory, and transceiver may be implemented as separate chips, or at least two or more blocks/functions may be implemented as a single chip.

The illustrated transceiver 2830 performs a signal transmission/reception operation. Specifically, IEEE 802.11 packets (e.g., IEEE 802.11a/b/g/n/ac/ax/be, etc.) can be transmitted and received.

The processor 2810 may implement the functions, processes, and/or methods proposed in the present specification. Specifically, the processor 2810 may receive a signal through the transceiver 2830, process a received signal, generate a transmission signal, and perform control for signal transmission.

The processor 2810 may include an application-specific integrated circuit (ASIC), another chipset, a logic circuit, and a data processing device. The memory 2820 may include read-only memory (ROM), random access memory (RAM), flash memory, memory card, storage medium, and/or other storage device.

The memory 2820 may store a signal (i.e., a received signal) received through the transceiver, and may store a signal (i.e., a transmission signal) to be transmitted through the transceiver. That is, the processor 2810 may acquire the received signal through the memory 2820 and store the signal to be transmitted in the memory 2820.

When the embodiment is implemented as software, the above-described technique may be implemented as a module (or process, function, etc.) that performs the above-described functions. Modules are stored in the memory and can be executed by the processor. The memory may be equipped inside or outside the processor, and may be connected to the processor through various well-known means.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problemsolving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method used in a wireless local area network (WLAN) system, the method comprising:
   transmitting, by a first station (STA) supporting multi-links including first and second links, a control field related to an operating mode (OM) of the first STA to a second STA, wherein the control field includes information related to on/off of at least one of the first and second links,
   wherein the control field further includes first information related to at least one operating band of the first STA and second information related to an operating parameter applied to the at least one operating band,
   wherein the first information includes first to fourth information bits,
   wherein a length of each of the first to fourth information bits is 1 bit,
   wherein the first information bit includes information related to whether an operating band of the first STA includes a 2.4 GHz band,
   wherein the second information bit includes information related to whether an operating band of the first STA includes a 5 GHz band, and
   wherein the third information bit includes information related to whether the operating band of the first STA includes a 6 GHz band;
   receiving, by the first STA, a response to the control field from the second STA; and
   performing, by the first STA, a communication with the second STA based on the control information.

2. The method of claim 1, wherein the first STA performs, after the response to the control field is received, an on/off operation for at least one of the first and second links based on the control field.

3. The method of claim 1, wherein the control field includes information related to a bandwidth of at least one of the first and second links, and a maximum number of the bandwidth is set to 320 MHZ,
   wherein the control field further includes information related to a number of reception (RX) streams applied to at least one of the first and second links, and a maximum number of the RX stream is set to 16, and
   wherein the control field further includes information related to a number of transmission (TX) streams applied to at least one of the first and second links, and a maximum number of the TX stream is set to 16.

4. The method of claim 1, wherein the response to the control field includes acknowledgement (ACK) information for the control field.

5. The method of claim 1, wherein the information related to on/off of at least one of the first and second links is configured based on a bitmap, a first value of an individual bit of the bitmap is related to an off operation of a corresponding link, and a second value of an individual bit of the bitmap is related to an on operation of a corresponding link.

6. The method of claim 1, wherein the control field includes index information related to at least one of the first and second links.

7. The method of claim 1, wherein the first STA is a non-access point (AP), and the second STA is an AP.

8. The method of claim 1, further comprising:
while performing an association procedure between the first and second STAs, transmitting, by the first STA to the second STA, capability information related to the OM of the first STA.

9. The method of claim 1, wherein the third information bit includes information related to whether a first operating channel of the first STA is included in the 6 GHz band, and
wherein the fourth information bit includes information related to whether the second operating channel of the first STA is included in the 6 GHz band.

10. The method of claim 1, wherein the second information includes channel width information related to a channel width applied to the at least one operating band and stream information related to a number of spatial streams (SS) applied to the at least one operating band.

11. The method of claim 10, wherein the at least one operating band includes a plurality of operating bands, and the channel width information and the stream information are commonly applied to the plurality of operating bands.

12. A first station (STA) supporting multi-links including first and second links in a wireless local area network (WLAN) system, the first STA comprising:
a transceiver configured to transmit and/or receive a wireless signal; and
a processor coupled to the transceiver,
wherein the processor is configured to:
transmit, to a second STA, a control field related to an operating mode (OM) of the first STA, wherein the control field includes information related to on/off of at least one of the first and second links,
wherein the control field further includes first information related to at least one operating band of the first STA and second information related to an operating parameter applied to the at least one operating band,
wherein the first information includes first to fourth information bits,
wherein a length of each of the first to fourth information bits is 1 bit,
wherein the first information bit includes information related to whether an operating band of the first STA includes a 2.4 GHz band,
wherein the second information bit includes information related to whether an operating band of the first STA includes a 5 GHz band, and
wherein the third information bit includes information related to whether the operating band of the first STA includes a 6 GHz band;
receive a response to the control field from the second STA; and
perform a communication with the second STA based on the control information.

\* \* \* \* \*